United States Patent
Yamada et al.

(10) Patent No.: US 11,074,378 B1
(45) Date of Patent: Jul. 27, 2021

(54) NON-TRANSITORY COMPUTER READABLE RECORDING MEDIUM STORING A COMPUTER PROGRAM, SIMULATION METHOD AND SIMULATION DEVICE FOR SIMULATING DYNAMIC BEHAVIOR OF ELECTROMAGNETIC COMPONENT

(71) Applicant: JSOL Corporation, Tokyo (JP)

(72) Inventors: Takashi Yamada, Tokyo (JP); Koji Tani, Osaka (JP)

(73) Assignee: JSOL Corporation, Tokyo (JP)

(*) Notice: Subject to any disclaimer, the term of this patent is extended or adjusted under 35 U.S.C. 154(b) by 0 days.

(21) Appl. No.: 16/950,331

(22) Filed: Nov. 17, 2020

Related U.S. Application Data

(63) Continuation of application No. PCT/JP2020/024259, filed on Jun. 19, 2020.

(30) Foreign Application Priority Data

May 7, 2020 (JP) .............................. JP2020-082054

(51) Int. Cl.
*G06F 30/30* (2020.01)
*H02J 50/70* (2016.01)
(Continued)

(52) U.S. Cl.
CPC .............. *G06F 30/23* (2020.01); *G06F 30/30* (2020.01); *H02J 50/70* (2016.02);
(Continued)

(58) Field of Classification Search
CPC combination set(s) only.
See application file for complete search history.

(56) References Cited

U.S. PATENT DOCUMENTS 5,097,190 A * 3/1992 Lyons .................. H02P 25/089
                                                    318/400.01
5,592,939 A * 1/1997 Martinelli .............. A61B 34/20
                                                    128/899
(Continued)

FOREIGN PATENT DOCUMENTS

| JP | 2012-143144 A | 7/2012 |
| JP | 2018-124831 A | 8/2018 |
| WO | WO2019163587 A1 | 8/2019 |

OTHER PUBLICATIONS

Kaimori et al., Behavior Modeling of Permanent Magnet Synchronous Motors Using Flux Linkages for Coupling with Circuit Simulation, IEEJ Journal of Industry Applications, Japan, The institute of Electrical Engineers of Japan, vol. 7, No. 1, pp. 56-63 (2018).
(Continued)

*Primary Examiner* — Kibrom K Gebresilassie
(74) *Attorney, Agent, or Firm* — Bret E. Field; Bozicevic, Field & Francis LLP

(57) ABSTRACT

A computer program causes a computer to execute processing of simulating behavior of an electromagnetic component including a coil at each of a plurality of time points based on an analytic model of the electromagnetic component. The processing comprises creating a look-up table storing a flux linkage of the coil, an inductance of the coil and a current in the coil that are obtained by a magnetic field analysis based on the analytic model in association with one another, and simulating behavior of the electromagnetic component by referring to the look-up table using currents in the coil calculated at a previous simulation step and at a step before the previous simulation step.

6 Claims, 11 Drawing Sheets

(51) Int. Cl.
*G06F 30/23* (2020.01)
*G06F 111/10* (2020.01)
*H02P 21/22* (2016.01)
*H02J 50/80* (2016.01)

(52) U.S. Cl.
CPC .......... *G06F 2111/10* (2020.01); *H02J 50/80* (2016.02); *H02P 21/22* (2016.02)

(56) References Cited

U.S. PATENT DOCUMENTS

| | | | | |
|---|---|---|---|---|
| 5,812,433 | A * | 9/1998 | Kawabata | G05D 7/0635 703/13 |
| 6,493,573 | B1 * | 12/2002 | Martinelli | A61B 90/36 128/899 |
| 8,344,669 | B1 * | 1/2013 | Gadda | H02P 25/064 318/135 |
| 10,622,932 | B2 * | 4/2020 | Holthaus | H02P 27/08 |
| 2008/0048593 | A1 * | 2/2008 | Takeuchi | H02P 6/16 318/139 |
| 2009/0261679 | A1 * | 10/2009 | Sakai | H02K 1/2766 310/156.53 |
| 2011/0010118 | A1 * | 1/2011 | Gaarder | G01R 21/133 702/60 |
| 2011/0090606 | A1 * | 4/2011 | Ramirez | H02H 7/04 361/35 |
| 2011/0181273 | A1 * | 7/2011 | Iida | A61B 5/062 324/207.11 |
| 2012/0169268 | A1 * | 7/2012 | Choi | H02P 21/0021 318/767 |
| 2013/0211804 | A1 * | 8/2013 | Yamada | G06F 30/20 703/6 |
| 2014/0055136 | A1 * | 2/2014 | Leussler | G01R 33/3415 324/309 |
| 2016/0226417 | A1 * | 8/2016 | Nomura | H02P 25/064 |
| 2018/0131302 | A1 * | 5/2018 | Frampton | H02P 9/14 |
| 2018/0262134 | A1 * | 9/2018 | Chen | H02P 25/08 |
| 2019/0245467 | A1 * | 8/2019 | Wang | H02P 21/14 |
| 2020/0403549 | A1 * | 12/2020 | Lee | H02P 27/085 |

OTHER PUBLICATIONS

Extended European Search Report for European Application No. 20811230.0 dated Jun. 21, 2021, 9 pages.

Rasilo et al., Comparison of Finite-Element-Based State-Space Models for PM Synchronous Machines, IEEE Transactions on Energy Conversion, vol. 29, No. 2, Mar. 24, 2014, pp. 535-543, DOI: 10.1109/TEC2014.2307472.

Chen et al., FEA-Based Mathematical Modeling and Simulation for IPMSM Drive with Consideration of Saturation and Cross-Coupling Influence, Proceedings of the 22nd IEEE International Conference on Electrical Machines and Systems, Aug. 11, 2019, pp. 1-5, DOI: 10.1109/ICEMS.2019.8922054.

Bostanci et al., Influence of Phase Magnetic Couplings on Phase Current Characteristics of Multiphase BLDC Machines With Overlapping Phase Windings, IEEE Transactions on Magnetics, May 7, 2015, pp. 1-13, DOI:10.1109/TMAG.2015.2430833.

* cited by examiner

F I G . 1
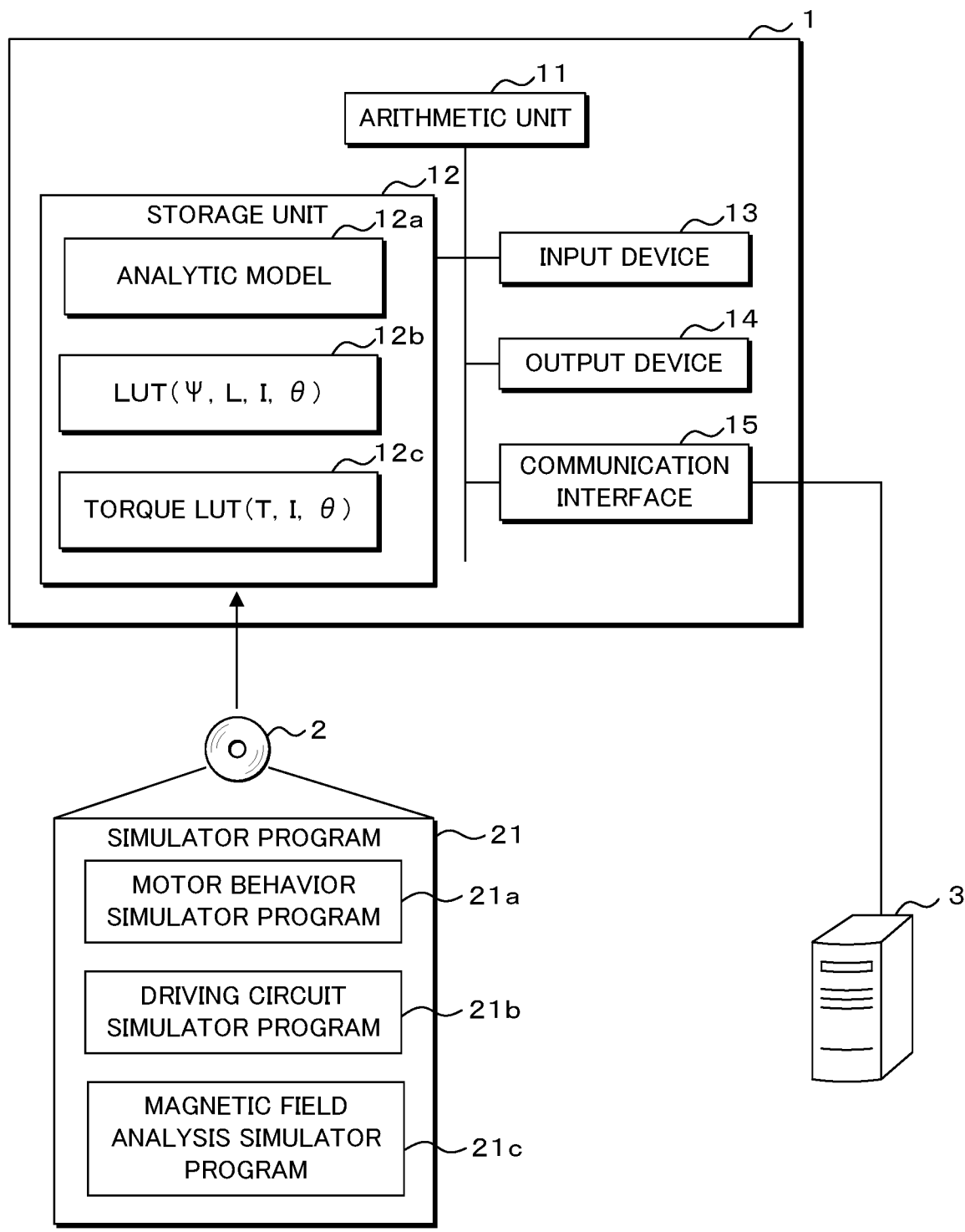

F I G . 3
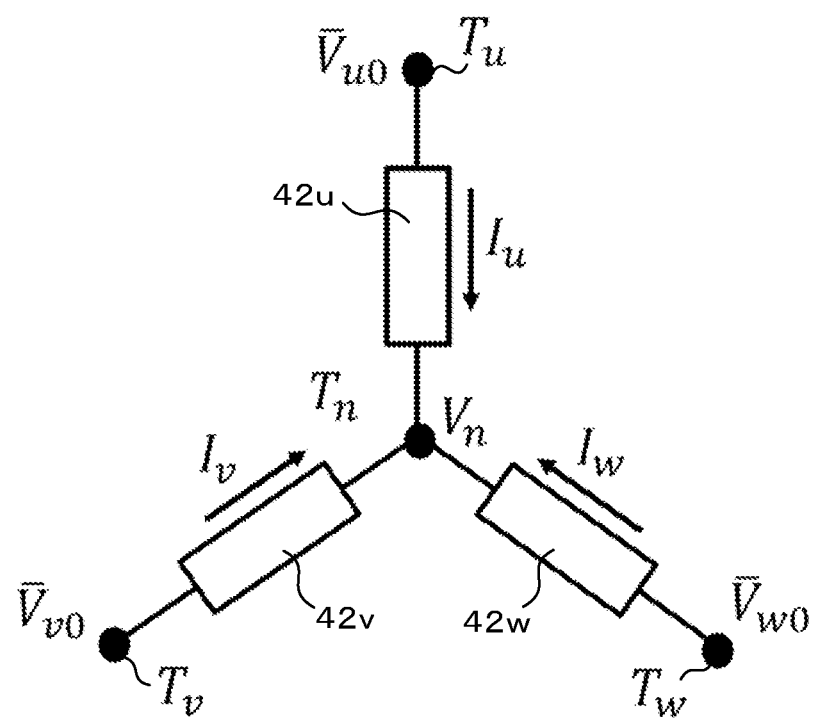

NON-TRANSITORY COMPUTER READABLE RECORDING MEDIUM STORING A COMPUTER PROGRAM, SIMULATION METHOD AND SIMULATION DEVICE FOR SIMULATING DYNAMIC BEHAVIOR OF ELECTROMAGNETIC COMPONENT

CROSS-REFERENCE TO RELATED APPLICATIONS

This application is a continuation application of PCT International Application No. PCT/JP2020/024259, which has an International filing date of Jun. 19, 2020 and designated the United States of America, and claiming priority on Patent Application No. 2020-082054 filed in Japan on May 7, 2020.

FIELD

The present invention relates to a computer program, a simulation method and a simulation device that simulates the dynamic behavior of an electromagnetic component including a coil based on an analytic model of the electromagnetic component.

BACKGROUND

For development of a motor and a driving circuit, a simulation device for simulating the dynamic behavior of a motor has been used. In order to specifically and accurately simulate the behavior of a motor, a motor behavior simulator that simulates the behavior of a motor using the characteristics obtained by a magnetic field analysis and a driving circuit simulator that simulates the operation of a driving circuit of the motor are configured to be coupled. In the coupled simulator, the driving circuit simulator invokes the motor behavior simulator for each simulation step corresponding to each of the time points in a time series to specifically simulate the behavior of the motor, and simulates the behavior of the driving circuit by using the simulation results.

The motor behavior simulator previously creates and stores a look-up table (LUT) showing the characteristics such as flux linkages, etc. depending on the driving state by performing a magnetic field analysis on the analytic model representing the shape and electromagnetic characteristics of the motor formed by multiple coils, a stator and a rotor.

The motor behavior simulator simulates the behavior of the motor by referring to the LUT obtained by the magnetic field analysis.

The motor is a star-connected three-phase permanent magnet motor, for example. In this case, the motor behavior simulator solves voltage equations expressed by Equations (1)-(3) below to thereby calculate currents in the coils of the motor and simulates the behavior of the motor.

$$V_{u0}-V_n=RI_u+d\Psi_u(I_u,I_v,I_w,\theta)/dt \quad (1)$$

$$V_{v0}-V_n=RI_v+d\Psi_v(I_u,I_v,I_w,\theta)/dt \quad (2)$$

$$V_{w0}-V_n=RI_w+d\Psi_w(I_u,I_v,I_w,\theta)/dt \quad (3)$$

where $V_{u0}$, $V_{v0}$, $V_{w0}$: voltage to be applied the to terminal of each coil
$V_n$: voltage at the neutral point
R: electrical resistance of each
$I_u$, $I_v$, $I_q$: current flowing in each coil
$\Psi_u$, $\Psi_v$, $\Psi_w$: flux linkage in each coil
θ: mechanical angle of the rotor Furthermore, the principle of current conservation shown in Equation (4) below holds at the neutral point.

$$I_u+I_v+I_w=0 \quad (4)$$

The flux linkage Ψ is a function of a current and a mechanical angle of the rotor. Solving the nonlinear equations expressed by Equations (1)-(3) above generally needs repetitive calculation such as a Newton-Raphson method (see Hiroyuki Kaimori, Kan Akatsu, Behavior Modeling of Permanent Magnet Synchronous Motors Using Flux Linkages for Coupling with Circuit Simulation, IEEJ Journal of Industry Applications, Japan, The institute of Electrical Engineers of Japan, Vol. 7, No. 1 pp. 56-63, for example).

Such repetitive calculation is a problem in the case of simulating an electromagnetic component including a coil as well.

SUMMARY

In the conventional method, there was a problem of the need for repetitive calculations to solve the voltage equations as described above.

An object of the present disclosure is to provide a computer program, a simulation method and a simulation device that are able to simulate the dynamic behavior of an electromagnetic component by solving nonlinear voltage equations without performing repetitive calculation.

A computer program according to the present disclosure causes a computer to execute processing of simulating behavior of an electromagnetic component including a coil at each of a plurality of time points based on an analytic model of the electromagnetic component. The processing comprises: creating a look-up table storing a flux linkage of the coil, an inductance of the coil and a current in the coil that are obtained by a magnetic field analysis based on the analytic model in association with one another, and simulating behavior of the electromagnetic component by referring to the look-up table using currents in the coil calculated at a previous simulation step and at a step before the previous simulation step.

A simulation method according to the present disclosure is a simulation method causing a computer to execute processing of simulating behavior of an electromagnetic component including a coil at each of a plurality of time points based on an analytic model of the electromagnetic component, the processing comprising: creating a look-up table storing a flux linkage of the coil, an inductance of the coil and a current in the coil that are obtained by a magnetic field analysis based on the analytic model in association with one another; and simulating behavior of the electromagnetic component by referring to the look-up table using currents in the coil calculated at a previous simulation step and at a step before the previous simulation step.

A simulation device according to the present disclosure comprises an arithmetic unit that simulates behavior of an electromagnetic component including a coil at each of a plurality of time points based on an analytic model of the electromagnetic component, the arithmetic unit creating a look-up table storing a flux linkage of the coil, an inductance of the coil and a current in the coil that are obtained by a magnetic field analysis based on the analytic model in association with one another; and simulating behavior of the electromagnetic component by referring to the look-up table using currents in the coil calculated at a previous simulation step and at a step before the previous simulation step.

According to the present disclosure, it is possible to simulate the dynamic behavior of an electromagnetic component by solving nonlinear voltage equations without performing repetitive calculation.

The above and further objects and features will more fully be apparent from the following detailed description with accompanying drawings.

BRIEF DESCRIPTION OF THE DRAWINGS

FIG. 1 is a block diagram illustrating the configuration of a simulation device according to Embodiment 1 of the present disclosure.

FIG. 3 is a schematic view illustrating the circuit configuration of the motor.

DETAILED DESCRIPTION

Figure 2:
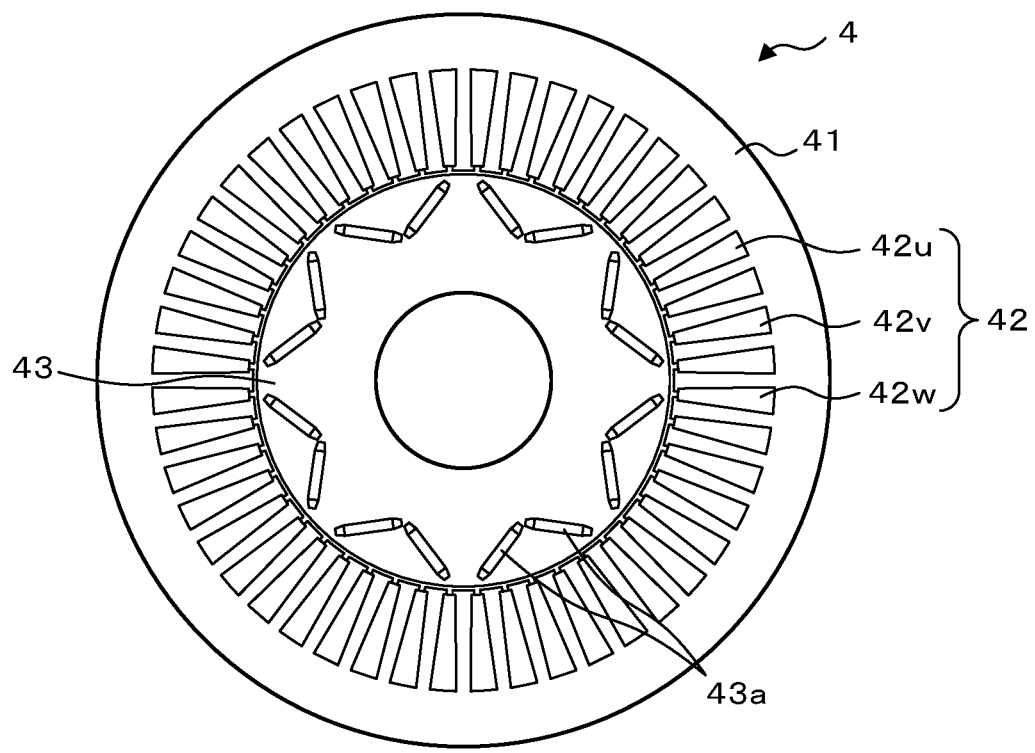
FIG. 2 is a schematic view illustrating a motor viewed from the direction of a rotation shaft.

The present disclosure will be described below with reference to the drawings showing embodiments thereof.

Embodiment 1

FIG. 1 is a block diagram illustrating the configuration of a simulation device 1 according to Embodiment 1 of the present disclosure. A simulation device according to an embodiment of the present disclosure is denoted by the reference numeral 1 in the drawing. The simulation device 1 is a computer including an arithmetic unit 11 such as a central processing unit (CPU), for example, to which a storage unit 12 is connected through a bus. The storage unit 12 is provided with a nonvolatile memory and a volatile memory, for example. The nonvolatile memory is a ROM such as an electrically erasable programmable ROM or the like. The nonvolatile memory stores a control program needed for initial operation of the computer and a simulator program 21 according to the present embodiment. The simulator program 21 includes, for example, a motor behavior simulator program (computer program) 21a, a driving circuit simulator program 21b, a magnetic field analysis simulator program 21c and so on. By executing the simulator program 21, the arithmetic unit 11 functions as a motor behavior simulator for simulating the behavior of the motor 4 (see FIG. 2) at each of the multiple time points, as a driving circuit simulator for simulating the behavior of the driving circuit for driving the motor 4, and as a magnetic field analysis simulator for performing a magnetic field analysis on the behavior of the motor 4 by the magnetic field analysis method such as a finite-element method or a boundary element method. The volatile memory is a RAM such as a dynamic RAM (DRAM), a static RAM (SRAM) or the like, and temporarily stores the control program or the simulator program 21 read from the nonvolatile memory when the arithmetic processing by the arithmetic unit 11 is executed, or various data generated through the arithmetic processing performed by the arithmetic unit 11.

The storage unit 12 further stores an analytic model 12a representing a two-dimensional or a three-dimensional shape of multiple coils 42, a stator 41 and a rotor 43 (see FIG. 2) that form the motor 4 and the electromagnetic characteristic thereof, a driving circuit model for driving a motor 4 and so on.

FIG. 2 is a schematic view illustrating the motor 4 viewed from the direction of a rotation shaft while FIG. 3 is a schematic view illustrating the circuit configuration of the motor 4. The motor 4 to be simulated is a three-phase permanent magnet synchronous motor, for example. The motor 4 illustrated in FIG. 2 is an interior permanent magnet synchronous motor (PMSM) having eight poles and 48 slots. The motor 4 includes a cylindrical stator 41 having U phase coils 42u, V phase coils 42v and W phase coils 42w for generating field flux that are circumferentially disposed at equally spaced intervals and a rotor 43 that is concentrically disposed in the inner diameter side of the stator 41. The coils 42 are star-connected as illustrated in FIG. 3, for example. In FIG. 3, Tn is the neutral point. Tu, Tv and Tw are terminals for applying voltage to the U phase coil 42u, the V phase coil 42v and the w phase coil 42w, respectively. The rotor 43 is cylindrical and includes multiple pairs of permanent magnets. It is noted that the number of poles, the number of slots and the number of coils 42 are not limited thereto. The analytic model 12a includes a three-dimensional shape model such as three-dimensional CAD data representing the shapes of the multiple coils 42, the stator 41 and the rotor 42 that form the motor 4, for example, and material characteristics or the like of the components that form the three-dimensional shape model. The material characteristics include a magnetizing property, an electric characteristic, a mechanical property, a heat characteristic, an iron loss characteristic or the like. The electric characteristics include conductivity, relative dielectric constant, etc.

The driving circuit to be simulated is formed by a driver and an inverter, for example. The storage unit 12 stores a driving circuit model representing multiple circuit elements forming the driver and the inverter, the connected state of the circuit elements and the properties of the circuit elements.

Furthermore, the storage unit 12 stores an LUT 12b and a torque LUT 12c as characteristic databases for simulating the dynamic behavior of the motor 4. Each of the characteristic databases is created before simulation of the behavior of the motor 4. The details of the LUT 12b and the torque LUT 12c will be described later.

It is noted the storage unit 12 may include a readable disk drive such as a hard disk drive or a solid state drive and a CD-ROM drive or the like capable of reading data from a portable recording medium 2. The simulator program 21 or the motor behavior simulator program 21a according to the present embodiment are computer-readably recorded in the recording medium 2 such as a compact disc (CD)-ROM, a digital versatile disc (DVD)-ROM, a blu-ray disk (BD) (Registered trademark) or the like as portable media. It is noted that the optical disk is one example of the recording medium 2. The simulator program 21 or the motor behavior simulator program 21a may also be computer-readably recorded in a flexible disk, a magneto-optical disk, an external hard disk, a semiconductor memory or the like. The arithmetic unit 11 reads the simulator program 21 or the motor behavior simulator program 21a from the recording medium 2 and stores it in the hard disk drive, the solid state drive or the like. The arithmetic unit 11 executes the simulator program 21 recorded in the recording medium 2 or the simulator program 21 stored in the storage unit 12 to cause the computer to function as the simulation device 1.

Moreover, the simulation device 1 is provided with an input device 13 such as a keyboard, a mouse or the like and an output device 14 such as a liquid crystal display, a CRT display or the like and accepts operation by the user such as data input.

Additionally, the simulation device 1 is provided with a communication interface 15 and may be configured to download the simulator program 21 or the motor behavior simulator program 21a according to the present disclosure from an external server computer 3 connected to the communication interface 15 and execute the processing by the arithmetic unit 11.

Figure 4:
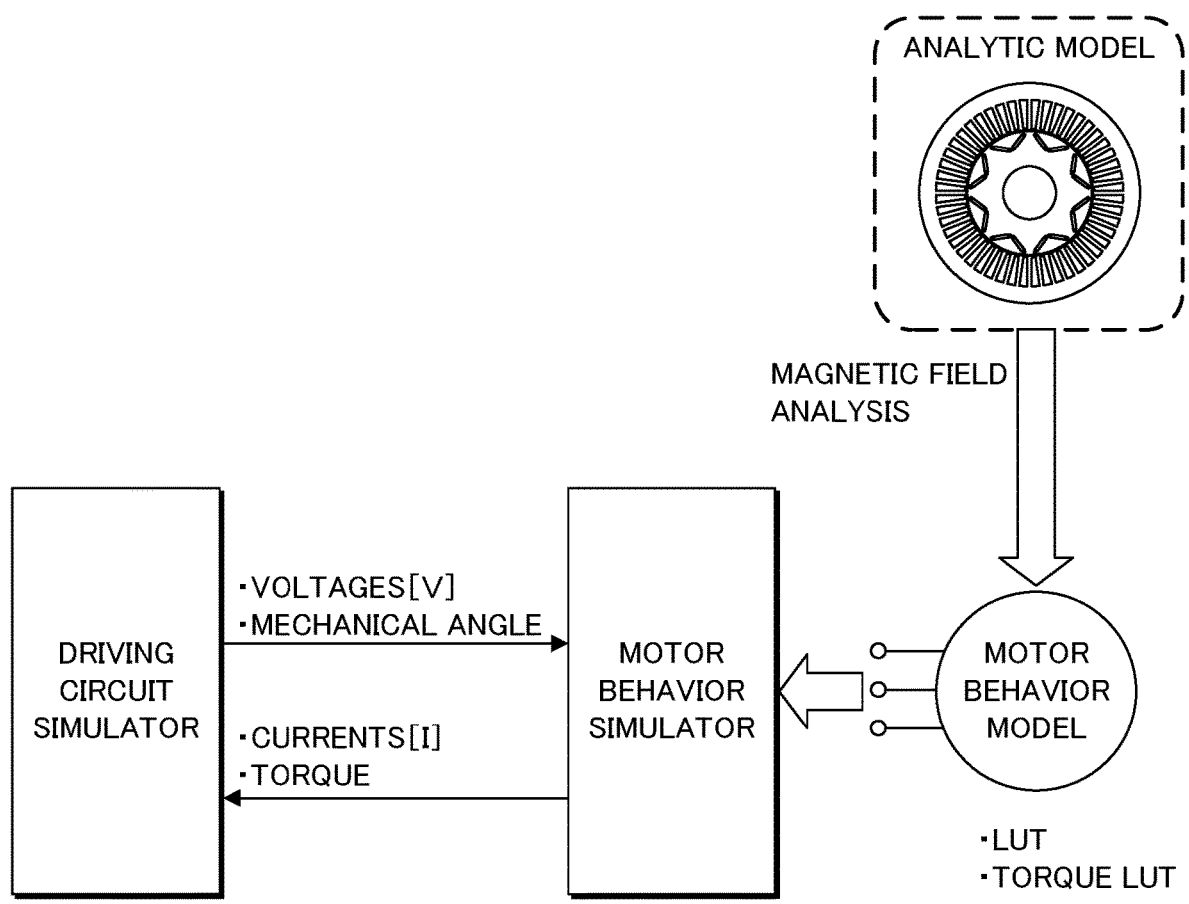
FIG. 4 is a conceptual diagram showing the outline of a coupled analysis to be executed by the simulation device.

FIG. 4 is a conceptual diagram illustrating the outline of a coupled analysis to be executed by the simulation device 1. First, the simulation device 1 calculates various characteristics of the motor 4 by the magnetic field analysis based on the analytic model 12a such as a finite-element method model or the like before simulating the behavior of the motor 4. For example, the arithmetic unit 11 creates the LUT ($\Psi$, L, I and $\theta$) 12b, etc. storing, as characteristics of the motor 4, a total magnetic flux $\Psi$ (hereinafter simply referred to as a flux linkage) being a sum of flux linkage components related to the permanent magnets 43a of the rotor 43 and flux linkage components related to phase currents, inductances L of the respective coils 42, currents I flowing in the respective coils 42 and a mechanical angle $\theta$ of the rotor 43 in association with one another. The inductance L includes a self-inductance of each of the coils 42 and a mutual inductance between the coils 42. The arithmetic unit 11 further creates the torque LUT 12c storing a torque T produced in the rotor 43, currents I flowing in the respective coils 42 and the mechanical angle $\theta$ of the rotor 43 in association with one another.

The simulation device 1 couples the motor behavior simulator with the driving circuit simulator to thereby simulate the dynamic behavior of the motor 4. The driving circuit simulator passes voltages [V]=[Vu, Vv and Vw] to be applied to the terminals Tu, Tv and Tw of the respective coils 42 of the motor 4 and the mechanical angle of the rotor 43 to the motor behavior simulator. The motor behavior simulator evaluates currents [I]=[Iu, Iv and Iw] of the respective coils 42 and a torque of the motor 4 by referring to the LUT 12b and the torque LUT 12c using the voltages [V] and the mechanical angle or the like of the rotor 43, and returns the simulation results to the driving circuit simulator. From this point onward, by repetitively executing similar processing, the dynamic behavior of the motor 4 can be simulated.

The procedure of creating the LUT 12b and the procedure of simulating the behavior of the motor 4 will be described in order as a simulation method according to the present embodiment.

Figure 5:
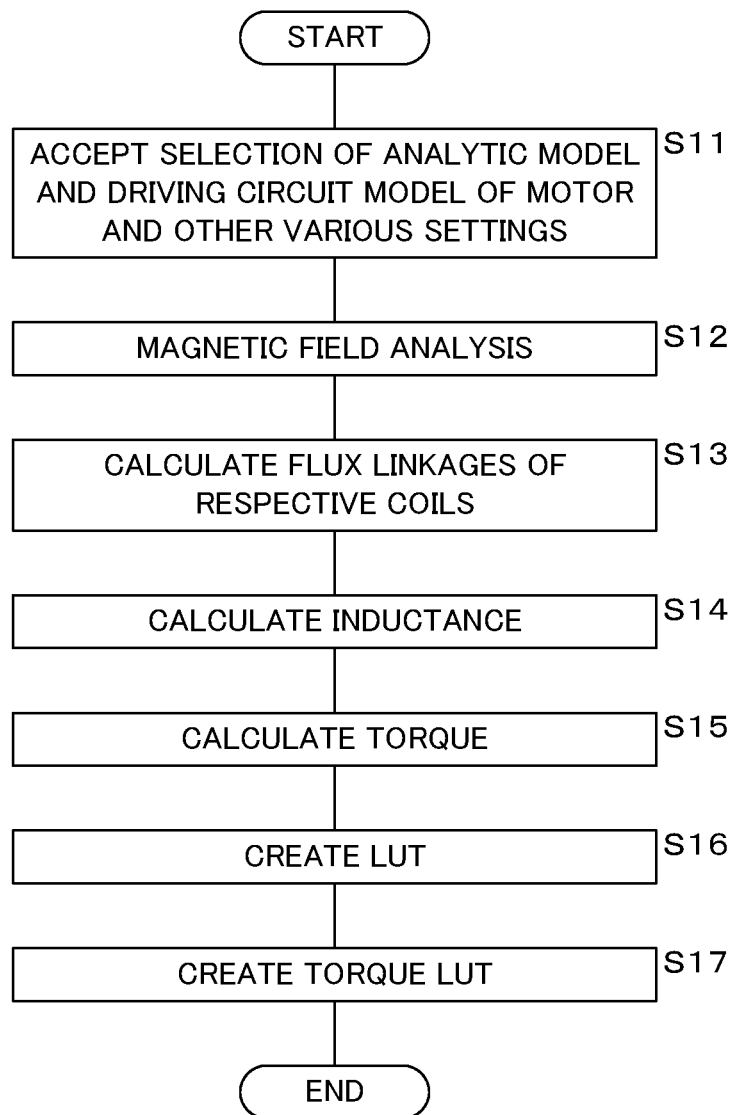
FIG. 5 is a flowchart showing a processing procedure relating to creation of an LUT to be performed by an arithmetic unit.

FIG. 5 is a flowchart showing a processing procedure relating to creation of the LUT 12b to be performed by the arithmetic unit 11. The arithmetic unit 11 of the simulation device 1 executes the following processing according to the motor behavior simulator program 21a stored in the storage unit 12. The arithmetic unit 11 first accepts selection of the analytic model 12a and the driving circuit model of the motor 4 to be simulated and other various settings by the input device 13 (step S11).

Then, the arithmetic unit 11 executes a magnetic field analysis by the finite-element method while setting parameters indicating the driving states, that is, setting slightly changed values of currents flowing in the respective coils 42 and the mechanical angles of the rotor 43 (step S12). It is noted that when setting values to currents flowing in the respective coils 42, the values of the current flowing in the coils 42 are set so as to satisfy the principle of current conservation. In the finite-element method, the three-dimensional shape model of the motor 4 is divided into multiple elements. For example, the arithmetic unit 11 divides the three-dimensional shape model of the motor 4 into multiple tetrahedral elements, hexahedral elements, quadrangular pyramid elements, triangular prism elements and so on. The arithmetic unit 11 calculates the plural simultaneous linear equations obtained from the Maxwell equation under a specific boundary condition, for example, the Dirichlet boundary condition or the Neumann boundary condition to thereby evaluate a magnetic vector potential for each of the elements. The magnetic field or the magnetic flux density for each of the components of the motor 4 can be obtained from the magnetic vector potential. The magnetic field or the magnetic flux density is basic information for calculating a current, a torque or the like. It is noted that a quasi-stationary magnetic field is described by the Maxwell equation.

Subsequently, the arithmetic unit 11 calculates the flux linkages of the respective coils 42 depending on the currents of the respective coils 42 and the position of the rotor 43 based on the magnetic field analysis results at step S12 (step S13). The arithmetic unit 11 further calculates the self-inductances and the mutual inductances of the respective coils 42 (step S14).

The self-inductance and mutual inductance calculated here are differential inductances and expressed by Equation (5) below (hereinafter, simply referred to as self-inductance and mutual inductance.).

$$L = \partial\Psi/\partial I = \{\Psi(I+\Delta I, \theta) - \Psi(I, \theta)\}/\Delta I \quad (5)$$

where L is differential inductance (self-inductance and mutual inductance)
$\Psi$ is the flux linkage of each coil 42,
I is current flowing in each coil 42
$\Delta I$ is minute variation of current.

It is noted that, for a three-phase coil, the above-described differential inductances are evaluated for each of the flux linkages of the coils 42 and for each of the slightly varying currents flowing in the coils 42, and are represented by a 3-by-3 inductance matrix. The 9 matrix components arranged in a 3-by-3 matrix are expressed as $L_{uu}=\partial \Psi u/\partial Iu$, $L_{uv}=\partial \Psi u/\partial Iv$, $L_{uw}=\partial \Psi u/\partial Iw$, $L_{vu}=\partial \Psi v/\partial Iu$, $L_{vv}=\partial \Psi v/\partial Iv$, $L_{vw}=\partial \Psi v/\partial Iw$, $L_{wu}=\partial Ww/\partial Iu$, $L_{wv}=\partial \Psi w/\partial Iv$, and $L_{ww}=\partial \Psi w/\partial Iw$.

Then, the arithmetic unit 11 calculates an electromagnetic force exerted on the rotor 43 depending on the currents flowing in the respective coils 42 and the position of the rotor 43 based on the magnetic field analysis results at step S12 to calculate a torque exerted on the rotor 43 (step S15). The arithmetic unit 11 calculates the electromagnetic force exerted on the rotor 43 by using a nodal force method, for example.

Next, the arithmetic unit 11 creates the LUT 12b storing the flux linkages of the respective coils, the self-inductances and the mutual inductances of the respective coils 42, currents flowing in the respective coils 42 and the mechanical angle of the rotor 43 in association with one another, based on the magnetic field analysis results at step S12 (step S16).

Then, the arithmetic unit 11 creates the torque LUT 12c storing the torque calculated at step S15, the current flowing in the respective coils 42 and the mechanical angle of the rotor 43 in association with one another (step S17) and ends the processing.

It is noted that though the LUT 12b and the torque LUT 12c are described as separate tables, these tables may be configured as a single table.

Figure 6:
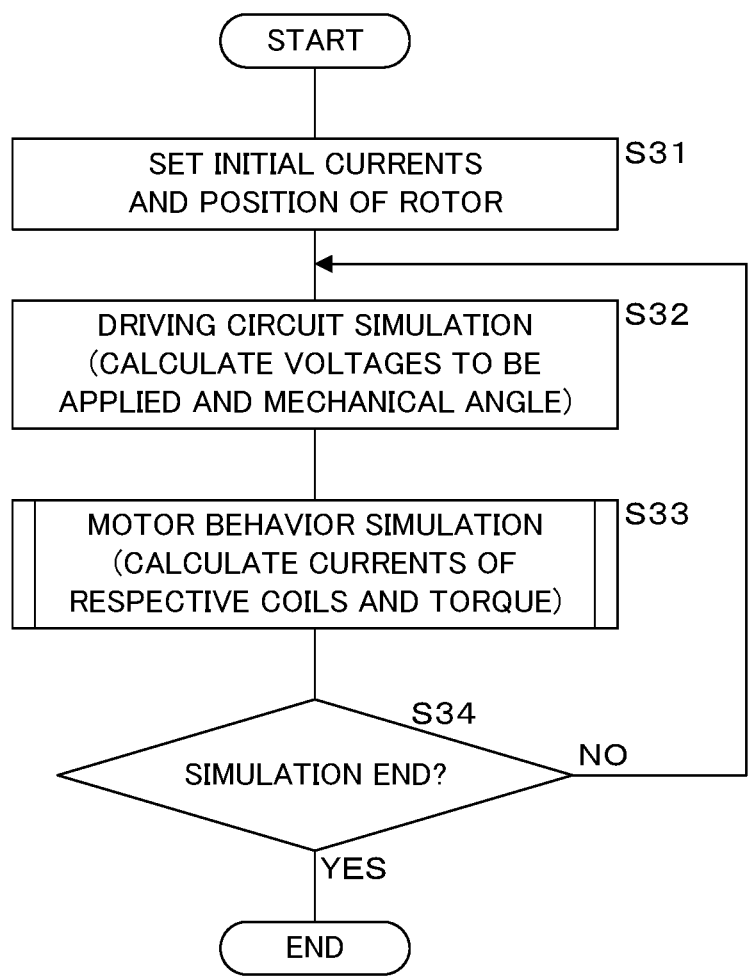
FIG. 6 is a flowchart showing a processing procedure relating to a coupled analysis to be performed by the arithmetic unit.

FIG. 6 is a flowchart showing a processing procedure relating to a coupled analysis to be performed by the arithmetic unit 11. The arithmetic unit 11 sets initial values of voltages to be applied to the coils 42, currents therein, the position of the rotor 43, etc. (step S31).

Then, the arithmetic unit 11 calculates voltages to be applied to the coils 42 and a mechanical angle of the rotor 43 at the next simulation step based on the currents of the respective coils 42 and the torque exerted on the rotor 43 calculated at the previous simulation step (step S32). The processing at step S32 is executed by the driving circuit simulator (see FIG. 4) and provides the motor behavior simulator with the voltages $[V]=[Vu, Vv, Vw]$ and the mechanical angle of the rotor 43 as the simulation results.

Subsequently, the arithmetic unit 11 simulates the behavior of the motor 4 based on the voltages to be applied to the motor 4, and the currents of the respective coils 42, the flux linkages of the respective coils 42 and the position of the rotor 43 that had been calculated before the previous simulation step, and calculates currents flowing in the respective coils 42 and a torque produced in the rotor 43 (step S33). The processing at step S33 is executed by the motor behavior simulator (see FIG. 4), and passes the currents $[I]=[Iu, Iv, Iw]$ of the respective coils 42 and the torque produced in the rotor 43 as simulation results to the driving circuit simulator. The details of the processing at step S33 will be described below.

Next, the arithmetic unit 11 determines whether or not a simulation end condition is satisfied (step S34). For example, the arithmetic unit 11 ends the simulation if a predetermined number of simulation steps corresponding to a predetermined real time are executed. If determining that the simulation end condition is not satisfied (step S34: NO), the arithmetic unit 11 returns the processing to step S32 to repetitively execute the processing at steps S32 and S33. If determining that the simulation end condition is satisfied (step S34: YES), the arithmetic processing 11 ends the processing.

Before the details of the processing procedure to be performed by the arithmetic unit 11 at step S33 is described, the theory of a method of calculating currents flowing in the respective coils 42 and a voltage at the neutral point based on the voltages to be applied to the respective coils 42 will be described below.

The voltage equations of the star-connected circuit as illustrated in FIG. 3 can be expressed by Equations (1)-(3) above. Moreover, in the neutral point Tn, the principle of current conservation as expressed by Equation (4) above is established.

Taking note of the voltage equation of the U phase coil 42u, substituting the time differential $\Delta t$ for the time differential of the voltage equation expressed by Equation (1) above gives Equation (6) below.

$$V_{u0}^{(n)} - V_n^{(n)} = RI_u^{(n)} + \frac{\Psi_u(I_*^{(n)}, \theta^{(n)}) - \Psi_u(I_*^{(n-1)}, \theta^{(n-1)})}{\Delta t} \qquad (6)$$

Note that the upper-right superscript (n) means a value at the nth simulation step.

$V_{u0}^{(n)}$: voltage to the applied to the terminal of the it phase coil $V_n^{(n)}$: voltage at the neutral point $I_*^{(n)}$: $(I_u^{(n)}, I_v^{(n)}, I_w^{(n)})$ $I_u^{(n)}$, $I_v^{(n)}$, $I_w^{(n)}$: current timing in each coil $\theta^{(n)}$: mechanical angle of the rotor $\Psi_u(I_*^{(n)}, \theta^{(n)})$: flux linkage in the 9 phase coil $\Delta t$: time increment between simulation steps Here, the flux linkage $\Psi$ is dependent on the current I of an unknown, and can be explicitly expressed by using the current I The flux linkage component derived from current can be described by using a differential inductance and a current, and thus the time differential component of the flux linkage in Equation (6) above is separated into the flux linkage component derived from current and the rest, and can be expressed by Equation (7) below.

$$\frac{\Psi_u(I_*^{(n)}, \theta^{(n)}) - \Psi_u(I_*^{(n-1)}, \theta^{(n-1)})}{\Delta t} = \qquad (7)$$
$$\left( L_{uu}(I_*^{(n-1)}, \theta^{(n)}) \frac{I_u^{(n)} - I_u^{(n-1)}}{\Delta t} + L_{uv}(I_*^{(n-1)}, \theta^{(n)}) \frac{I_v^{(n)} - I_v^{(n-1)}}{\Delta t} + \right.$$
$$\left. L_{uw}(I_*^{(n-1)}, \theta^{(n)}) \frac{I_w^{(n)} - I_w^{(n-1)}}{\Delta t} \right) +$$
$$\frac{\Psi_u(I_*^{(n)}, \theta^{(n)}) - \Psi_u(I_*^{(n-1)}, \theta^{(n)})}{\Delta t} - \left( L_{uu}(I_*^{(n-1)}, \theta^{(n)}) \frac{I_u^{(n)} - I_u^{(n-1)}}{\Delta t} + \right.$$
$$\left. L_{uv}(I_*^{(n-1)}, \theta^{(n)}) \frac{I_v^{(n)} - I_v^{(n-1)}}{\Delta t} + L_{uw}(I_*^{(n-1)}, \theta^{(n)}) \frac{I_w^{(n)} - I_w^{(n-1)}}{\Delta t} \right)$$

where $L_{uu}(I_*^{(n)}, \theta^{(n)})$: self-inductance of the U phase coil $L_{uv}(I_*^{(n)}, \theta^{(n)})$: mutual inductance between the U phase coil and the V phase coil $L_{uw}(I_*^{(n)}, \theta^{(n)})$: mutual inductance between the U phase coil and the W has coil The second term and the third term on the right side of Equation (7) above represent voltages caused by a factor other than change in current, such as rotation of the rotor 43 or the like. When the second term and the third term are further approximated to values at the previous simulation step, Equation (7) above can be expressed by Equation (8) below.

$$\frac{\Psi_u(I_*^{(n)}, \theta^{(n)}) - \Psi_u(I_*^{(n-1)}, \theta^{(n-1)})}{\Delta t} \approx \qquad (8)$$

$$\left( L_{uu}(I_*^{(n-1)}, \theta^{(n)}) \frac{I_u^{(n)} - I_u^{(n-1)}}{\Delta t} + L_{uv}(I_*^{(n-1)}, \theta^{(n)}) \frac{I_v^{(n)} - I_v^{(n-1)}}{\Delta t} + \right.$$

$$\left. L_{uw}(I_*^{(n-1)}, \theta^{(n)}) \frac{I_w^{(n)} - I_w^{(n-1)}}{\Delta t} \right) +$$

$$\frac{\Psi_u(I_*^{(n-1)}, \theta^{(n)}) - \Psi_u(I_*^{(n-2)}, \theta^{(n-1)})}{\Delta t} -$$

$$\left( L_{uu}(I_*^{(n-2)}, \theta^{(n-1)}) \frac{I_u^{(n-1)} - I_u^{(n-2)}}{\Delta t} + L_{uv}(I_*^{(n-2)}, \theta^{(n-1)}) \frac{I_v^{(n-1)} - I_v^{(n-2)}}{\Delta t} + \right.$$

$$\left. L_{uw}(I_*^{(n-2)}, \theta^{(n-1)}) \frac{I_w^{(n-1)} - I_w^{(n-2)}}{\Delta t} \right)$$

Substituting Equation (8) above into Equation (6) above gives Equation (9) below.

$$V_{u0}^{(n)} - V_n^{(n)} = \qquad (9)$$

$$RI_u^{(n)} + \left( L_{uu}(I_*^{(n-1)}, \theta^{(n)}) \frac{I_u^{(n)} - I_u^{(n-1)}}{\Delta t} + L_{uv}(I_*^{(n-1)}, \theta^{(n)}) \frac{I_v^{(n)} - I_v^{(n-1)}}{\Delta t} + \right.$$

$$\left. L_{uw}(I_*^{(n-1)}, \theta^{(n)}) \frac{I_w^{(n)} - I_w^{(n-1)}}{\Delta t} \right) +$$

$$\frac{\Psi_u(I_*^{(n-1)}, \theta^{(n)}) - \Psi_u(I_*^{(n-2)}, \theta^{(n-1)})}{\Delta t} -$$

$$\left( L_{uu}(I_*^{(n-2)}, \theta^{(n-1)}) \frac{I_u^{(n-1)} - I_u^{(n-2)}}{\Delta t} + L_{uv}(I_*^{(n-2)}, \theta^{(n-1)}) \frac{I_v^{(n-1)} - I_v^{(n-2)}}{\Delta t} + \right.$$

$$\left. L_{uw}(I_*^{(n-2)}, \theta^{(n-1)}) \frac{I_w^{(n-1)} - I_w^{(n-2)}}{\Delta t} \right)$$

Multiplying both sides of Equation (9) above by time $\Delta t$, and transposing the current I of the unknown and the voltage Vn of the unknown in the neutral point Tn to the left side and transposing the known term to the right side give Equation (10) below.

$$RI_u^{(n)}\Delta t + L_{uu}(I_*^{(n-1)},\theta^{(n)})I_u^{(n)} + L_{uv}(I_*^{(n-1)},\theta^{(n)})I_v^{(n)} + L_{uw}(I_*^{(n-1)},\theta^{(n)})I_w^{(n)} + V_n^{(n)}\Delta t = V_{u0}^{(n)}\Delta t + (L_{uu}(I_*^{(n-1)},\theta^{(n)})I_u^{(n-1)} + L_{uv}(I_*^{(n-1)},\theta^{(n)})I_v^{(n-1)} + L_{uw}(I_*^{(n-1)},\theta^{(n)})I_w^{(n-1)}) + (L_{uu}(I_*^{(n-2)},\theta^{(n-1)})(I_u^{(n-1)} - I_u^{(n-2)}) + L_{uv}(I_*^{(n-2)},\theta^{(n-1)})(I_v^{(n-1)} - I_v^{(n-2)}) + L_{uw}(I_*^{(n-2)},\theta^{(n-1)})(I_w^{(n-1)} - I_w^{(n-2)})) - (\Psi_u(I_*^{(n-1)},\theta^{(n)}) - \Psi_u(I_*^{(n-2)},\theta^{(n-1)}))) \qquad (10)$$

Similarly to the U phase coil 42u, the voltage equation of the V phase coil 42v expressed by Equation (2) above is expressed by Equation (11) below.

$$RI_v^{(n)}\Delta t + L_{vu}(I_*^{(n-1)},\theta^{(n)})I_u^{(n)} + L_{vv}(I_*^{(n-1)},\theta^{(n)})I_v^{(n)} + L_{vw}(I_*^{(n-1)},\theta^{(n)})I_w^{(n)} + V_n^{(n)}\Delta t = V_{v0}^{(n)}\Delta t + (L_{vu}(I_*^{(n-1)},\theta^{(n)})I_u^{(n-1)} + L_{vv}(I_*^{(n-1)},\theta^{(n)})I_v^{(n-1)} + L_{vw}(I_*^{(n-1)},\theta^{(n)})I_w^{(n-1)}) + (L_{vu}(I_*^{(n-2)},\theta^{(n-1)})(I_u^{(n-1)} - I_u^{(n-2)}) + L_{vv}(I_*^{(n-2)},\theta^{(n-1)})(I_v^{(n-1)} - I_v^{(n-2)}) + L_{vw}(I_*^{(n-2)},\theta^{(n-1)})(I_w^{(n-1)} - I_w^{(n-2)})) - (\Psi_v(I_*^{(n-1)},\theta^{(n)}) - \Psi_v(I_*^{(n-2)},\theta^{(n-1)}))) \qquad (11)$$

where $V_{v0}^{(n)}$: voltage to the applied to the terminal of the V phase coil $L_{vv}(I_*^{(n)}, \theta^{(n)})$: self-inductance of the V phase coil $L_{vu}(I_*^{(n)}, \theta^{(n)})$: mutual inductance between the V phase coil and the U phase coil $L_{uw}(I_*^{(n)}, \theta^{(n)})$: mutual inductance between the V phase coil and the W phase call Similarly to the U phase coil 42u, the voltage equation of the W phase coil 42w expressed by Equation (3) above is expressed by Equation (12) below.

$$RI_w^{(n)}\Delta t + L_{wu}(I_*^{(n-1)},\theta^{(n)})I_u^{(n)} + L_{wv}(I_*^{(n-1)},\theta^{(n)})I_v^{(n)} + L_{ww}(I_*^{(n-1)},\theta^{(n)})I_w^{(n)} + V_n^{(n)}\Delta t = V_{w0}^{(n)}\Delta t + (L_{wu}(I_*^{(n-1)},\theta^{(n)})I_u^{(n-1)} + L_{wv}(I_*^{(n-1)},\theta^{(n)})I_v^{(n-1)} + L_{ww}(I_*^{(n-1)},\theta^{(n)})I_w^{(n-1)}) + (L_{wu}(I_*^{(n-2)},\theta^{(n-1)})(I_u^{(n-1)} - I_u^{(n-2)}) + L_{wv}(I_*^{(n-2)},\theta^{(n-1)})(I_v^{(n-1)} - I_v^{(n-2)}) + L_{ww}(I_*^{(n-2)},\theta^{(n-1)})(I_w^{(n-1)} - I_w^{(n-2)})) - (\Psi_w(I_*^{(n-1)},\theta^{(n)}) - \Psi_w(I_*^{(n-2)},\theta^{(n-1)}))) \qquad (12)$$

where $V_{w0}^{(n)}$: voltage to be applied to the terminal of the W phase coil $L_{ww}(I_*^{(n)}, \theta^{(n)})$: self-inductance of the W phase coil $L_{wu}(I_*^{(n)}, \theta^{(n)})$: mutual inductance between the W phase coil and the phase coil $L_{wv}(I_*^{(n)}, \theta^{(n)})$: mutual inductance between the W phase coil and the V phase coil Equations (10), (11) and (12) above and the equation for conservation of current in Equation (4) above are collectively described in a matrix form to give Equation (13) below.

$$\begin{pmatrix} R\Delta t + L_{uu}(I_*^{(n-1)}, \theta^{(n)}) & L_{uv}(I_*^{(n-1)}, \theta^{(n)}) & L_{uw}(I_*^{(n-1)}, \theta^{(n)}) & \Delta t \\ L_{vu}(I_*^{(n-1)}, \theta^{(n)}) & R\Delta t + L_{vv}(I_*^{(n-1)}, \theta^{(n)}) & L_{vw}(I_*^{(n-1)}, \theta^{(n)}) & \Delta t \\ L_{wu}(I_*^{(n-1)}, \theta^{(n)}) & L_{wv}(I_*^{(n-1)}, \theta^{(n)}) & R\Delta t + L_{ww}(I_*^{(n-1)}, \theta^{(n)}) & \Delta t \\ 1 & 1 & 1 & 1 \end{pmatrix} \qquad (13)$$

$$\begin{pmatrix} I_u^{(n)} \\ I_v^{(n)} \\ I_w^{(n)} \\ V_n^{(n)} \end{pmatrix} =$$

$$\begin{pmatrix} V_{u0}^{(n)}\Delta t \\ V_{v0}^{(n)}\Delta t \\ V_{w0}^{(n)}\Delta t \\ 0 \end{pmatrix} + \begin{pmatrix} L_{uu}(I_*^{(n-1)}, \theta^{(n)}) & L_{uv}(I_*^{(n-1)}, \theta^{(n)}) & L_{uw}(I_*^{(n-1)}, \theta^{(n)}) & 0 \\ L_{vu}(I_*^{(n-1)}, \theta^{(n)}) & L_{vv}(I_*^{(n-1)}, \theta^{(n)}) & L_{vw}(I_*^{(n-1)}, \theta^{(n)}) & 0 \\ L_{wu}(I_*^{(n-1)}, \theta^{(n)}) & L_{wv}(I_*^{(n-1)}, \theta^{(n)}) & L_{ww}(I_*^{(n-1)}, \theta^{(n)}) & 0 \\ 0 & 0 & 0 & 0 \end{pmatrix} \begin{pmatrix} I_u^{(n-1)} \\ I_v^{(n-1)} \\ I_w^{(n-1)} \\ 0 \end{pmatrix} +$$

-continued $$\begin{pmatrix} L_{uu}(I_*^{(n-2)}, \theta^{(n-1)}) & L_{uv}(I_*^{(n-2)}, \theta^{(n-1)}) & L_{uw}(I_*^{(n-2)}, \theta^{(n-1)}) & 0 \\ L_{vu}(I_*^{(n-2)}, \theta^{(n-1)}) & L_{vv}(I_*^{(n-2)}, \theta^{(n-1)}) & L_{vw}(I_*^{(n-2)}, \theta^{(n-1)}) & 0 \\ L_{wu}(I_*^{(n-2)}, \theta^{(n-1)}) & L_{wv}(I_*^{(n-2)}, \theta^{(n-1)}) & L_{ww}(I_*^{(n-2)}, \theta^{(n-1)}) & 0 \\ 0 & 0 & 0 & 0 \end{pmatrix}$$

$$\begin{pmatrix} I_u^{(n-1)} - I_u^{(n-2)} \\ I_v^{(n-1)} - I_v^{(n-2)} \\ I_w^{(n-1)} - I_w^{(n-2)} \\ 0 \end{pmatrix} = \begin{pmatrix} \Psi_u(I_*^{(n-1)}, \theta^{(n)}) - \Psi_u(I_*^{(n-2)}, \theta^{(n-1)}) \\ \Psi_v(I_*^{(n-1)}, \theta^{(n)}) - \Psi_v(I_*^{(n-2)}, \theta^{(n-1)}) \\ \Psi_w(I_*^{(n-1)}, \theta^{(n)}) - \Psi_w(I_*^{(n-2)}, \theta^{(n-1)}) \end{pmatrix}$$

In Equation (13) above, the inductances and the flux linkages can be read by referring to the LUT 12b using the currents I=(Iu, Iv, Iw) and the mechanical angle θ of the rotor 43 as keys. According to Equation (13) above, by using the information at the previous simulation step (the (n−1)-th step) and at the step before the previous simulation step (the (n−2)-th step), the currents flowing in the respective coils 42 and the voltage at the neutral point Tn at the current simulation step (the n-th step) can be calculated without performing repetitive calculation.

Figure 7:
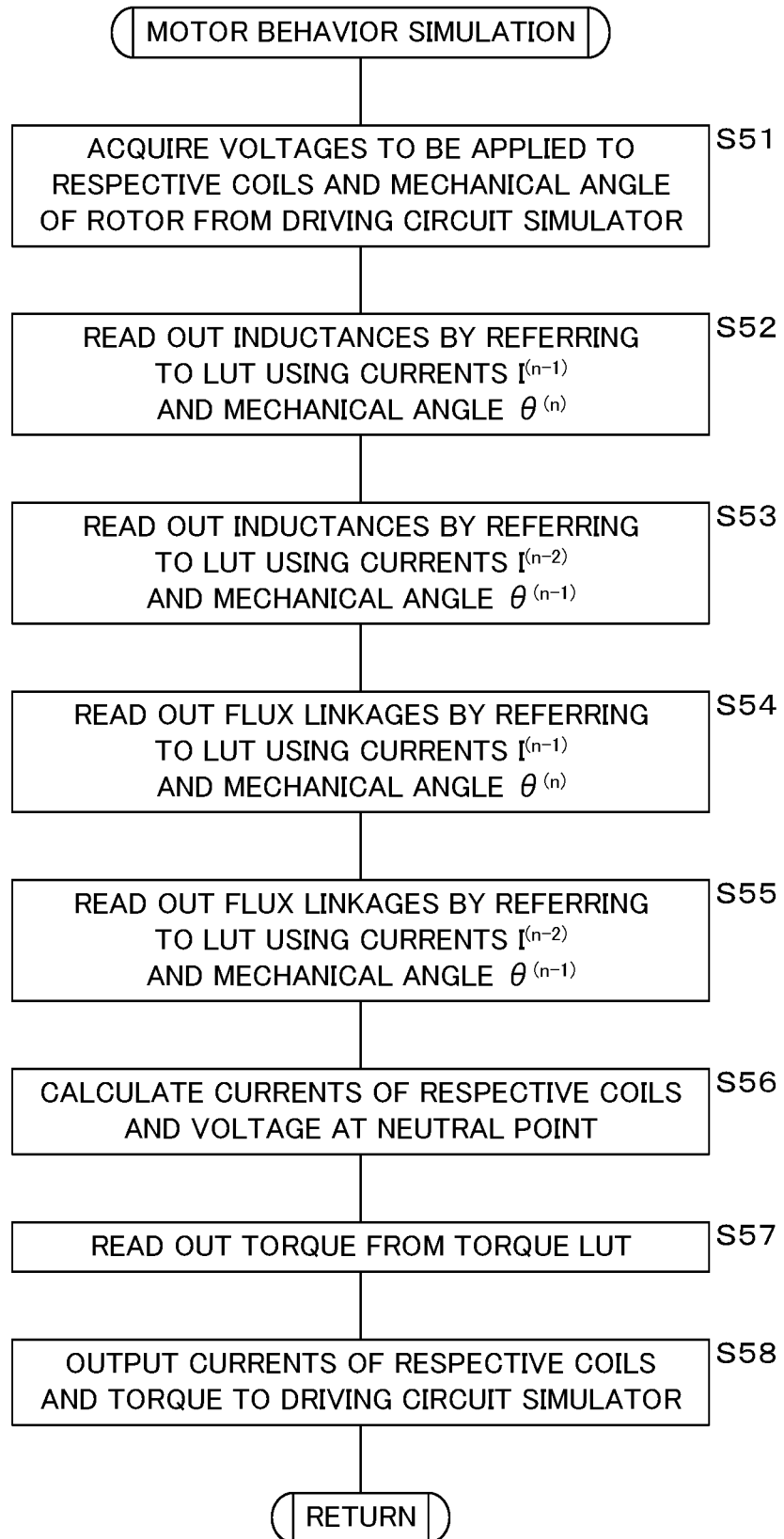
FIG. 7 is a flowchart showing a processing procedure relating to a motor behavior simulation according to Embodiment 1 to be performed by the arithmetic unit.

FIG. 7 is a flowchart showing a processing procedure relating to the motor behavior simulation according to Embodiment 1 to be performed by the arithmetic unit 11. The processing procedure at step S33 in the n-th step will be described below. Here, n is an integer equal to or larger than 3. The arithmetic unit 11 acquires the voltages to be applied to the respective coils 42 and the mechanical angle of the rotor 43 from the driving circuit simulator (step S51). For example, in a case where the driving circuit simulator is configured to output the simulation result in a file format, the arithmetic unit 11 reads out the voltages to be applied to the respective coils 42 and the mechanical angle of the rotor 43 from the file.

The arithmetic unit 11 reads out the self-inductances and the mutual inductances of the respective coils 42 by referring to the LUT 12b using the currents of the respective coils 42 at the (n−1)-th simulation step and the mechanical angle of the rotor 43 at the n-th simulation step as keys (step S52). Furthermore, the arithmetic unit 11 reads out the self-inductances and the mutual inductances of the respective coils 42 by referring to the LUT 12b using the currents of the respective coils 42 at the (n−2)-th simulation step and the mechanical angle of the rotor 43 at the (n−1)-th simulation step as keys (step S53).

Then, the arithmetic unit 11 reads out the flux linkages of the respective coils 42 by referring to the LUT 12b using the currents of the respective coils 42 at the (n−1)-th simulation step and the mechanical angle of the rotor 43 at the n-th simulation step as keys (step S54). Furthermore, the arithmetic unit 11 reads out the flux linkages of the respective coils 42 by referring to the LUT 12b using the currents of the respective coils 42 at the (n−2)-th simulation step and the mechanical angle of the rotor 43 at the (n−1)-th simulation step as keys (step S55).

For the convenience of explanation, though the processing steps are described from steps S52 to S55 in order, the processing order is not limited thereto. Moreover, the processing at steps S52 and S54 may simultaneously be executed. The processing at steps S53 and S55 may simultaneously be executed.

The arithmetic unit 11 calculates currents flowing in the respective coils 42 and a voltage at the neutral point Tn at the n-th simulation step by Equation (13) above based on the voltages to be applied to the respective coils 42, the inductances and the flux linkages read out at steps S52-S55 (step S56).

Then, the arithmetic unit 11 reads out the torque exerted on the rotor 43 by referring to the torque LUT 12c using the currents of the respective coils 42 calculated at step S56 and the mechanical angle of the rotor 43 as keys (step S57).

The arithmetic unit 11 then outputs the currents of the respective coils 42 calculated at step S56 and the torque read out at step S57 to the driving circuit simulator (step S58) and ends the processing.

The work and effect of the simulation device 1 thus configured, the simulation method and the simulator program 21 are described. The actual simulations for demonstrating the work and effect are performed by using the interior permanent magnet synchronous motor having a shape illustrated in FIG. 2 and having eight poles and 48 slots. The coils 42 are wound around the slots of the stator 41 by distributed winding.

Figure 8A:
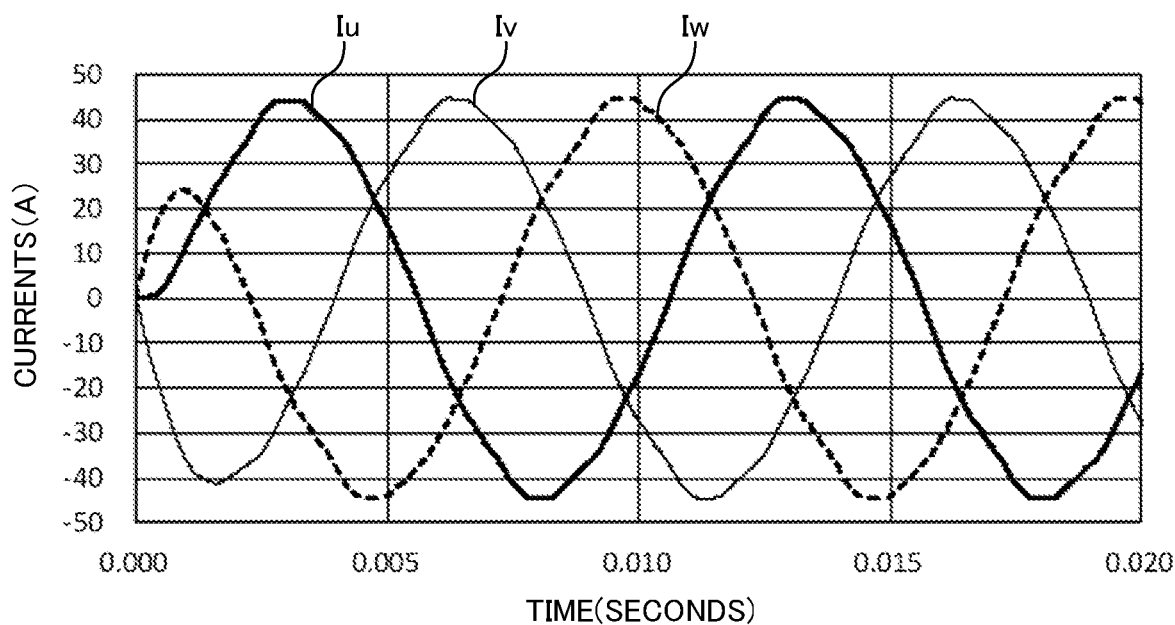
FIG. 8A is a graph showing a simulation result of phase currents indicating the work and effect of the simulation device according to Embodiment 1.
Figure 8B:
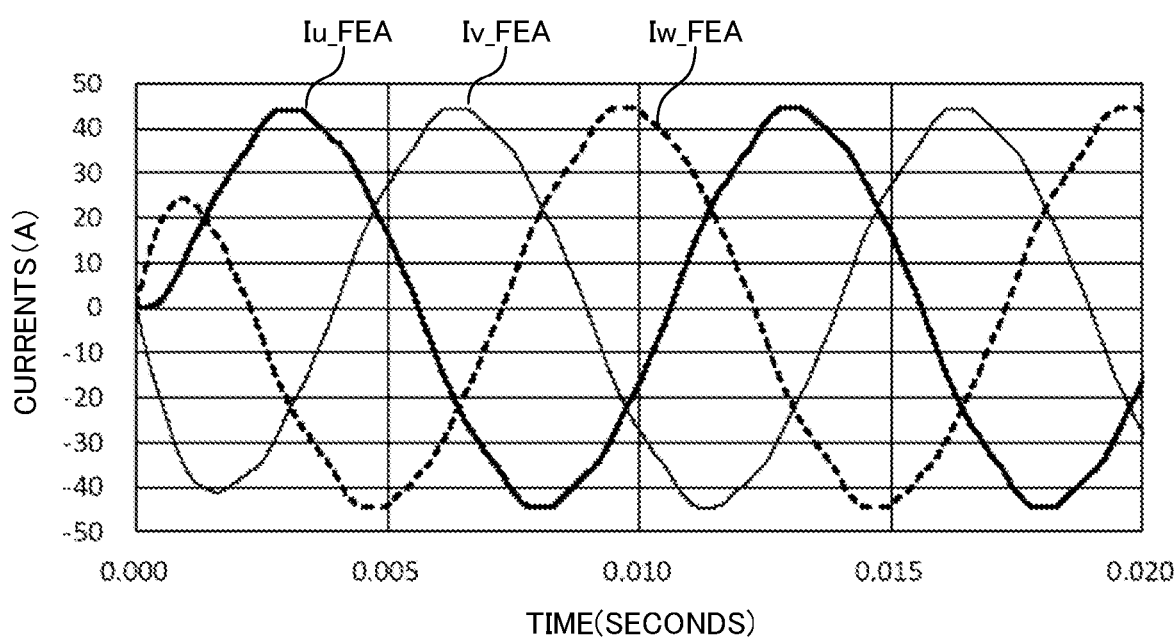
FIG. 8B is a graph showing a simulation result of phase currents indicating the work and effect of the simulation device according to Embodiment 1.
Figure 9A:
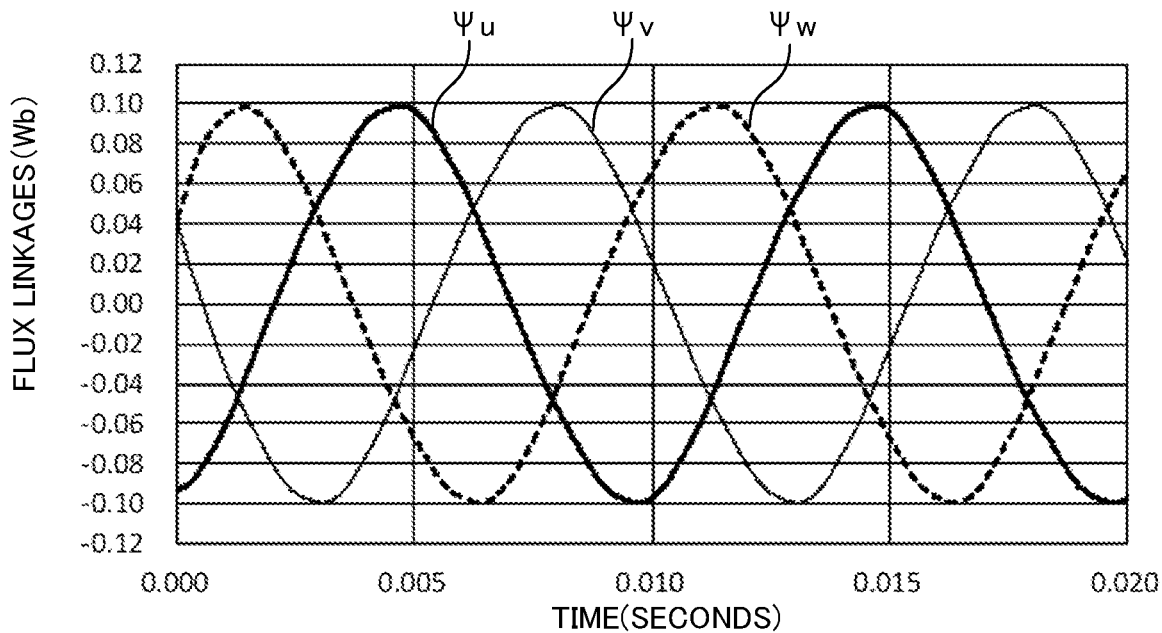
FIG. 9A is a graph showing a simulation result of flux linkages indicating the work and effect of the simulation device according to Embodiment 1.
Figure 9B:
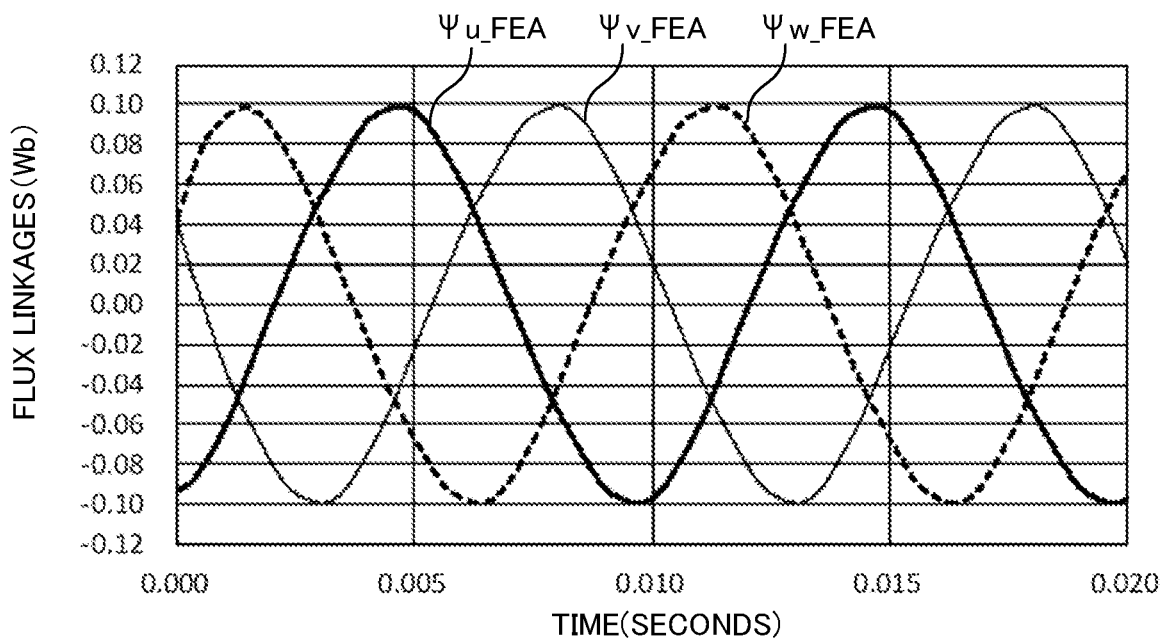
FIG. 9B is a graph showing a simulation result of flux linkages indicating the work and effect of the simulation device according to Embodiment 1.
Figure 10A:
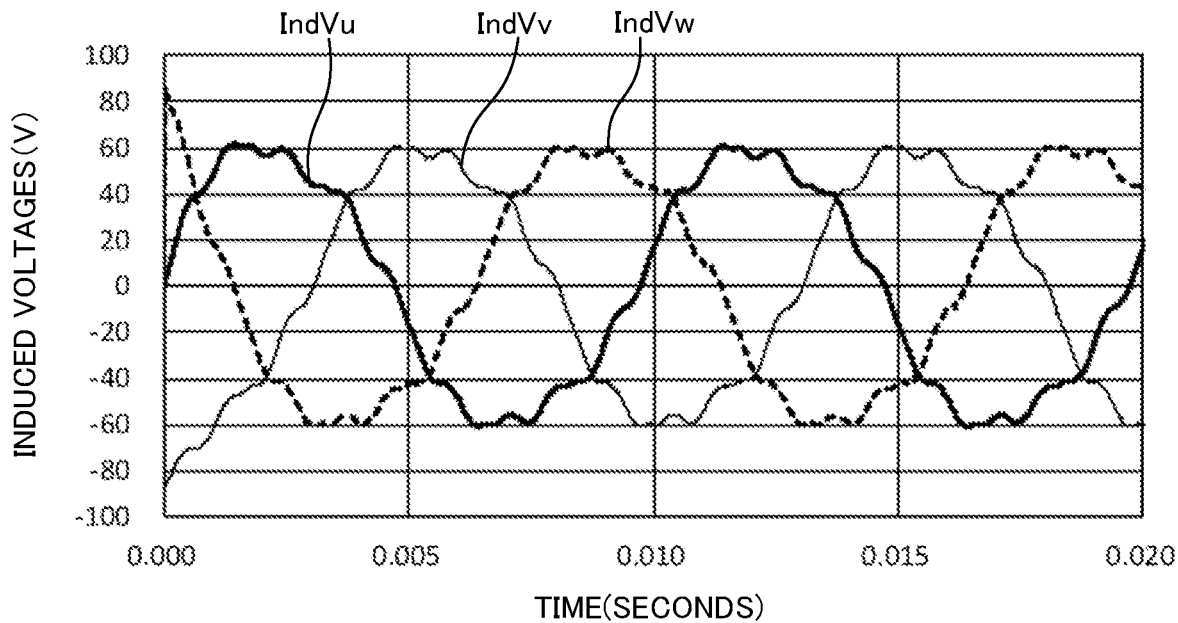
FIG. 10A is a graph showing a simulation result of induced voltages indicating the work and effect of the simulation device according to Embodiment 1.
Figure 10B:
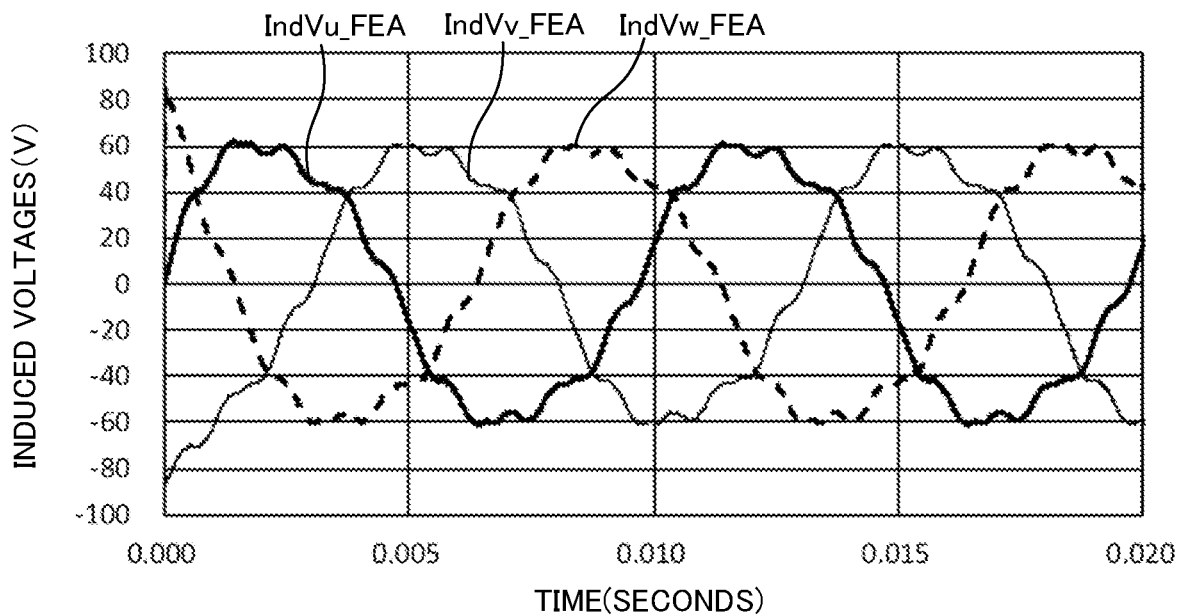
FIG. 10B is a graph showing a simulation result of induced voltages indicating the work and effect of the simulation device according to Embodiment 1.
Figure 11A:
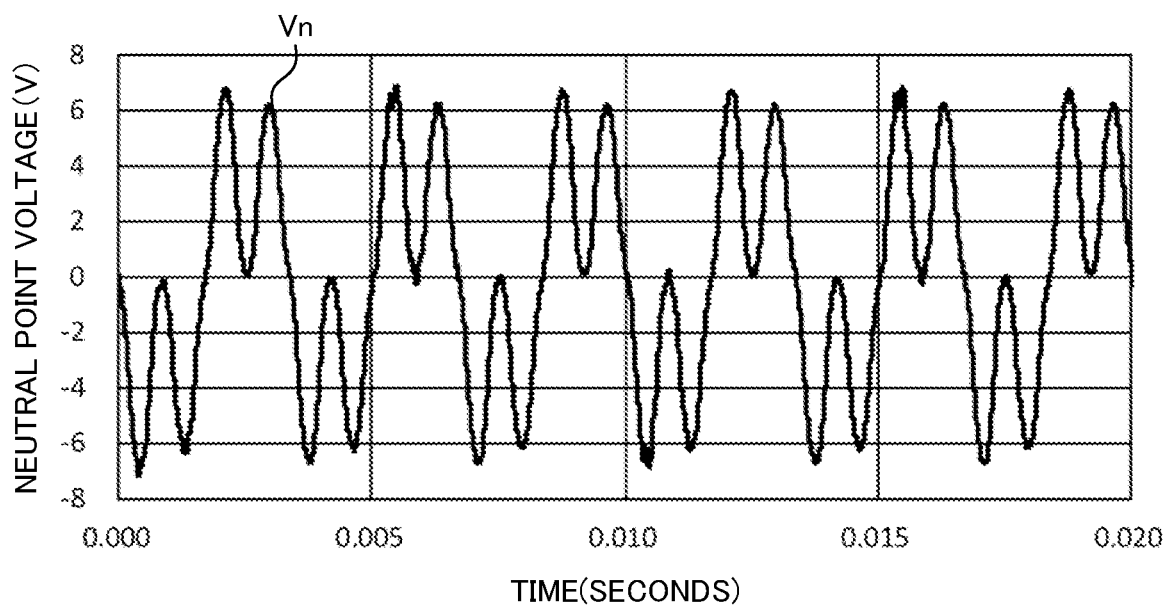
FIG. 11A is a graph showing a simulation result of a neutral-point voltage indicating the work and effect of the simulation device according to Embodiment 1.
Figure 11B:
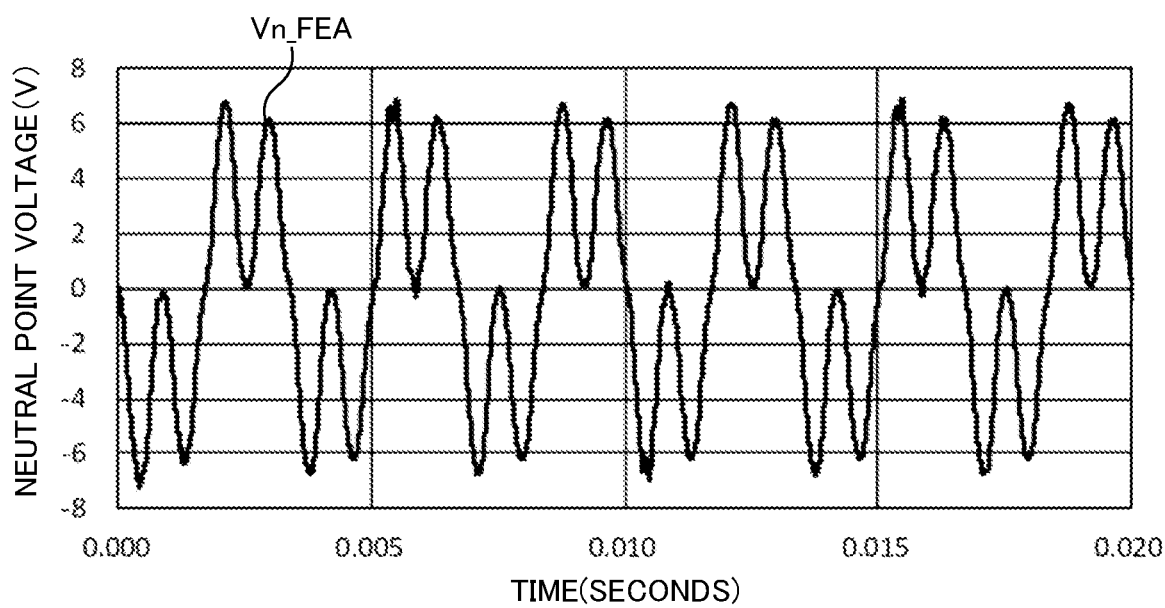
FIG. 11B is a graph showing a simulation result of a neutral-point voltage indicating the work and effect of the simulation device according to Embodiment 1.

FIGS. 8A and 8B, FIGS. 9A and 9B, FIGS. 10A and 10B and FIGS. 11A and 11B are graphs respectively showing the simulation results of phase currents, flux linkages, induced voltages and neutral point voltages representing the work and effect of the simulation device 1 according to Embodiment 1. FIG. 8A, FIG. 9A, FIG. 10A and FIG. 11A show arithmetic results obtained when the behavior of the motor 4 is simulated by using the simulation device 1 according to Embodiment 1 while FIG. 8B, FIG. 9B, FIG. 10B and FIG. 11B show arithmetic results obtained when the behavior of the motor 4 is simulated by the magnetic field analysis using the finite-element method. The horizontal axes of the graphs represent time. The vertical axes of the graphs in FIGS. 8A and 8B represent currents flowing in the respective coils 42, the vertical axes of the graphs in FIGS. 9A and 9B represent flux linkages of the respective coils 42, the vertical axes of the graphs in FIGS. 10A and 10B represent induced voltages of the respective coils 42, and the vertical axes of the graphs in FIGS. 11A and 11B represent voltages in the neutral point.

As illustrated in FIGS. 8A and 8B to FIGS. 11A and 11B, the phase currents, flux linkages, induced voltages and neutral point voltage of the respective coils 42 are reproduced with high accuracy.

As described above, the simulation device 1, the simulation method and the simulator program 21 according to Embodiment 1 can simulate the dynamic behavior of the motor 4 by solving the non-linear voltage equations without performing repetitive calculation.

Furthermore, as illustrated in FIGS. 8A and 8B to FIGS. 11A and 11B, the simulation results substantially the same as the arithmetic results that are strict solutions obtained by the magnetic field analysis can be obtained, which enables accurate simulation of the behavior of the motor 4.

In the present embodiment, though the present embodiment described the motor 4 as a rotary machine in which a mover is rotated, the present invention can be applied to a motor 4 acting as a linear motion machine in which a mover linearly moves to thereby simulate the dynamic behavior of the motor. This simulation of the behavior of the linear motion machine can be performed by a similar processing procedure with a slight difference in shape of the analytic model 12a.

Furthermore, though the present embodiment described an object to be analyzed that allows a mover to linearly move or rotatably move, the moving manner of the mover is not limited thereto. The present invention can also be applied to a motor allowing a mover to vibrate, a linear motor or a solenoid actuator allowing a mover to linearly move, or the like. Moreover, the present invention can be applied to an induction machine as well.

Additionally, the applicable object of the present invention is not limited to simulation of a motor having a mover, and the present invention can be applied to any electromagnetic component including multiple coils. For example, the present invention can also be applied to the case where the behavior of a motionless machine such as a transformer, a contactless charger or the like is simulated.

Furthermore, in the present embodiment, an example is described in which voltages are passed from the driving circuit simulator to the motor behavior simulator while currents and a torque are returned from the motor behavior simulator to the driving circuit simulator. However, the physical quantities to be exchanged between the respective simulators are not limited thereto and may appropriately be selected. Moreover, physical constants representing the states of the motor 4 or a generator may be exchanged.

For example, currents are passed from the driving circuit simulator to the motor behavior simulator while voltages are returned from the motor behavior simulator to the driving circuit simulator. In this case, the motor behavior simulator solves Equation 13 described above assuming that the currents are known quantities while the voltage of the respective coils 42 are unknown quantities to thereby evaluate voltages generated in the respective coils 42, and returns the evaluated voltages to the driving circuit simulator.

In addition, in Embodiment 1, the LUT 12b is described as information storing the currents flowing in the respective coils 42, the mechanical angle of the rotor 43, the flux linkages of the respective coils 42, and the inductances of the respective coils 42 in association with one another. Alternatively, it may be possible to use a first LUT that outputs the self-inductances and the mutual inductances of the respective coils 42 if the currents of the respective coils 42 and the mechanical angle of the rotor 43 are input and a second LUT that outputs the flux linkages of the respective coils 42 if the current of the respective coils 42 and the mechanical angle of the rotor 43 are input.

Furthermore, though the simulation of the behavior of the star-connected motor 4 is mainly described in Embodiment 1, the present invention can be applied to any circuit, and the connection method is not limited thereto. Thus, the present invention can also be applied to the case where the behavior of the motor 4 employing any connection method such as a delta connection is simulated. The delta connection is similar in a basic concept to that of the star connection, and the voltage equation is expressed by Equation (14) below. By solving Equation (14) below in a procedure similar to Embodiment 1, the behavior of the motor 4 can be simulated.

$$\begin{pmatrix} R\Delta t + L_{uu}(I_*^{(n-1)}, \theta^{(n)}) & L_{uv}(I_*^{(n-1)}, \theta^{(n)}) & L_{uw}(I_*^{(n-1)}, \theta^{(n)}) \\ L_{vu}(I_*^{(n-1)}, \theta^{(n)}) & R\Delta t + L_{vv}(I_*^{(n-1)}, \theta^{(n)}) & L_{vw}(I_*^{(n-1)}, \theta^{(n)}) \\ L_{wu}(I_*^{(n-1)}, \theta^{(n)}) & L_{wv}(I_*^{(n-1)}, \theta^{(n)}) & R\Delta t + L_{ww}(I_*^{(n-1)}, \theta^{(n)}) \end{pmatrix} \begin{pmatrix} I_u^{(n)} \\ I_v^{(n)} \\ I_w^{(n)} \end{pmatrix} = \qquad (14)$$

$$\begin{pmatrix} (V_{u0}^{(n)} - V_{v0}^{(n)})\Delta t \\ (V_{v0}^{(n)} - V_{w0}^{(n)})\Delta t \\ (V_{w0}^{(n)} - V_{u0}^{(n)})\Delta t \end{pmatrix} +$$

$$\begin{pmatrix} L_{uu}(I_*^{(n-1)}, \theta^{(n)}) & L_{uv}(I_*^{(n-1)}, \theta^{(n)}) & L_{uw}(I_*^{(n-1)}, \theta^{(n)}) \\ L_{vu}(I_*^{(n-1)}, \theta^{(n)}) & L_{vv}(I_*^{(n-1)}, \theta^{(n)}) & L_{vw}(I_*^{(n-1)}, \theta^{(n)}) \\ L_{wu}(I_*^{(n-1)}, \theta^{(n)}) & L_{wv}(I_*^{(n-1)}, \theta^{(n)}) & L_{ww}(I_*^{(n-1)}, \theta^{(n)}) \end{pmatrix} \begin{pmatrix} I_u^{(n-1)} \\ I_v^{(n-1)} \\ I_w^{(n-1)} \end{pmatrix} +$$

$$\begin{pmatrix} L_{uu}(I_*^{(n-2)}, \theta^{(n-1)}) & L_{uv}(I_*^{(n-2)}, \theta^{(n-1)}) & L_{uw}(I_*^{(n-2)}, \theta^{(n-1)}) \\ L_{vu}(I_*^{(n-2)}, \theta^{(n-1)}) & L_{vv}(I_*^{(n-2)}, \theta^{(n-1)}) & L_{vw}(I_*^{(n-2)}, \theta^{(n-1)}) \\ L_{wu}(I_*^{(n-2)}, \theta^{(n-1)}) & L_{wv}(I_*^{(n-2)}, \theta^{(n-1)}) & L_{ww}(I_*^{(n-2)}, \theta^{(n-1)}) \end{pmatrix} \begin{pmatrix} I_u^{(n-1)} - I_u^{(n-2)} \\ I_v^{(n-1)} - I_v^{(n-2)} \\ I_w^{(n-1)} - I_w^{(n-2)} \end{pmatrix} -$$

$$\begin{pmatrix} \Psi_u(I_*^{(n-1)}, \theta^{(n)}) - \Psi_u(I_*^{(n-2)}, \theta^{(n-1)}) \\ \Psi_v(I_*^{(n-1)}, \theta^{(n)}) - \Psi_v(I_*^{(n-2)}, \theta^{(n-1)}) \\ \Psi_w(I_*^{(n-1)}, \theta^{(n)}) - \Psi_w(I_*^{(n-2)}, \theta^{(n-1)}) \end{pmatrix}$$

Additionally, the behavior of the motor 4 can be simulated for a disconnected circuit as well as a normal circuit. For example, if the w-phase coil is disconnected to cause lack of a W phase, Equation (13) or (14) is solved assuming that Iw is equal to zero, whereby the behavior of the motor 4 in the disconnected state can be simulated.

Embodiment 2

A simulation device 1, a simulation method and a simulator program 21 according to Embodiment 2 are different from those of Embodiment 1 in that the behavior of an x-phase motor including a stator and a mover is simulated, and thus only the difference mainly will be described below. Here, x is a natural number equal to or larger than four. In the following description in Embodiment 2, the mover is assumed not to be limited to the rotor 43. Furthermore, it is assumed that the electrical resistances of the coils are not necessarily the same in the following description. Embodiment 2 is similar to Embodiment 1 in the configuration and work and effect otherwise, and thus the detailed description will not be made by applying similar reference symbols to the corresponding parts.

The voltage equations of the x phase motor can be expressed by Equation (15) below based on a concept similar to Embodiment 1.

$$\begin{pmatrix} L(I_*^{(n-1)}, \theta^{(n)}) + R\Delta t & 1\Delta t \\ 1^T & 0 \end{pmatrix} \begin{pmatrix} I^{(n)} \\ V_n^{(n)} \end{pmatrix} = \begin{pmatrix} V_0^{(n)} \Delta t \\ 0 \end{pmatrix} + \begin{pmatrix} L(I_*^{(n-1)}, \theta^{(n)}) & 0 \\ 0 & 0 \end{pmatrix} \begin{pmatrix} I^{(n-1)} \\ 0 \end{pmatrix} + \begin{pmatrix} L(I_*^{(n-2)}, \theta^{(n-1)}) & 0 \\ 0 & 0 \end{pmatrix} \begin{pmatrix} I^{(n-1)} - I^{(n-2)} \\ 0 \end{pmatrix} - \begin{pmatrix} \Psi(I_*^{(n-1)}, \theta^{(n)}) - \Psi(I_*^{(n-2)}, \theta^{(n-1)}) \\ 0 \end{pmatrix} \quad (15)$$

where the upper-right superscript (n) means a value at the n-th simulation step, $(L(I_*^{(n)}, \theta^{(n)}))_{ij} = L_{ij}(I_*^{(n)}, \theta^{(n)})$ $(R)_{ij} = R_i \delta_{i,j}$ $1 = (1,1 \ldots 1)^T$: x-order unit vector $I^{(n)} = (I_1^{(n)}, I_2^{(n)}, \ldots, I_x^{(n)})^T$ $V_0^{(n)} = (V_{10}^{(n)}, V_{20}^{(n)}, \ldots, V_{x0}^{(n)})^T$ $\Psi(I_*^{(n)}, \theta^{(n)}) = (\Psi_1(I_*^{(n)}, \theta^{(n)}), \Psi_2(I_*^{(n)}, \theta^{(n)}), \ldots, \Psi_x(I_*^{(n)}, \theta^{(n)}))^T$ i,j: 1, 2, . . . , x
x: the number of phases for the motor
$R_i$: electrical resistance of each coil
$\Delta t$: time increment between simulation steps
$\delta_{i,j}$: Kronecker's delta
$L_{ij}(I_*^{(n)}, \theta^{(n)})$: self-inductance (i=j) of the i phase coil or mutual inductance (i≠j) between the i phase coil and the j phase coil
$I_*^{(n)}$: $(I_1^{(n)}, I_2^{(n)}, \ldots, I_x^{(n)})$
$\theta^{(n)}$: position of the mover
$V_n^{(n)}$: voltage at the neutral point
$I_1^{(n)}, I_2^{(n)}, \ldots, I_x^{(n)}$: current flowing in each coil
$V_{10}^{(n)}, V_{20}^{(n)}, \ldots, V_{x0}^{(n)}$: voltage to be applied to each coil
$\Psi_1, \Psi_2, \ldots, \Psi_x$: flux linage in each coil The LUT 12b is a table storing the currents flowing in the respective coils 42 of the X phase, the position of the mover, the self-inductances and the mutual inductances of the respective coils 42 and the flux linkages of the respective coils 42 in association with one another.

The arithmetic unit 11 reads out the self-inductances and the mutual inductances of the respective coils 42 and the flux linkages of the respective coils 42 by referring to the LUT 12b using the currents of the respective coils 42 at the (n−1)-th simulation step and the mechanical angle of the mover at the n-th simulation step as keys similarly to Embodiment 1. Furthermore, the arithmetic unit 11 reads out the self-inductances and the mutual inductances of the respective coils 42 and the flux linkages of the respective coils 42 by referring to the LUT 12b using the currents of the respective coils 42 at the (n−2)-th simulation step and the mechanical angle of the rotor 43 at the (n−1)-th simulation step as keys.

The arithmetic unit 11 calculates current flowing in the respective coils 42 and a voltage at the neutral point Tn at the n-th simulation step by Equation (15) above based on the voltages to be applied to the respective coils 42, the inductances and the flux linkages read out at the above-described processing.

Likewise, the arithmetic unit 11 executes processing of reading out the torque exerted on the rotor 43 from the torque LUT 12c using the currents of the respective coils 42 obtained through the calculation and the mechanical angle of the rotor 43 as keys and outputting the currents of the respective coils 42 obtained through the calculation and the torque read out to the driving circuit simulator.

As described above, according to the simulation device 1, the simulation method and the simulator program 21 in Embodiment 2, it is possible to simulate the dynamic behavior of the motor 4 by solving the nonlinear voltage equations without performing repetitive calculation similarly to Embodiment 1.

Though Embodiment 2 described the star-connected x-phase motor used as one example, the connection method is not particularly limited thereto in the x-phase motor as well.

Embodiment 3

A simulation device 1, a simulation method and a simulator program 21 according to Embodiment 3 are different from Embodiments 1 and 2 in that the behavior of a transformer having X pieces of coils 42 is simulated, and thus only the difference will be described below. Here, X is a natural number equal to or larger than 1. The X piece or pieces of coils 42 are each primary coils, for example. If there are multiple coils 42, the following description is made assuming that the electrical resistances of the coils 42 are not necessarily the same. Embodiment 3 is similar to Embodiment 1 in the configuration and effect otherwise, and thus the detailed description will not be made here by applying similar reference symbols to the corresponding parts.

The voltage equations of the respective coils 42 are similar to Equation (15) above in Embodiment 2, and an equation independent of the mechanical angle θ is conceivable. In the case of a transformer failing to have the neutral point, an equation from which the neutral point voltage is neglected may be conceived.

The processing procedure performed by the arithmetic unit 11 is similar to that of Embodiment 2 except that a mover is not present and a torque is not calculated.

As described above, according to the simulation device 1, the simulation method and the simulator program 21 in Embodiment 3, it is possible to simulate the dynamic behavior of the transformer by solving the nonlinear voltage equations without performing repetitive calculation similarly to Embodiment 1.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A non-transitory computer readable recording medium storing a computer program for causing a computer to execute processing comprising:
   creating a table by a magnetic field analysis based on an analytic model of an electromagnetic component including a coil, the table including a flux linkage of the coil, an inductance of the coil and a current in the coil in association with one another, and
   simulating behavior of the electromagnetic component at each of a plurality of time points by referring to the table using currents in the coil calculated at a previous simulation step and at a step before the previous simulation step;
   wherein
   the electromagnetic component is a motor including a plurality of star-connected coils, and includes a stator and a mover,
   the table is a look-up table storing flux linkages of the plurality of coils, inductances of the plurality of coils, currents in the plurality of coils and a position of the mover in association with one another, and
   the program causes the computer to execute processing of:
   acquiring voltages to be applied to the coils of the motor from an external driving circuit simulator,
   reading out inductances of the plurality of coils and flux linkages of the coils by referring to the look-up table using currents the coils calculated at a previous simulation step and a position of the mover at a present simulation step,
   reading out inductances of the plurality of coils and flux linkages of the coils by referring to the look-up table using currents in the coils calculated at a step before the previous simulation step and a position of the mover at a previous simulation step, and
   calculating currents of the coils and a voltage at a neutral point at a present simulation step based on Equation (1) below:

$$\begin{pmatrix} L(I_*^{(n-1)}, \theta^{(n)}) + R\Delta t & 1\Delta t \\ 1^T & 0 \end{pmatrix} \begin{pmatrix} I^{(n)} \\ V_n^{(n)} \end{pmatrix} = \begin{pmatrix} V_0^{(n)}\Delta t \\ 0 \end{pmatrix} + \begin{pmatrix} L(I_*^{(n-1)}, \theta^{(n)}) & 0 \\ 0 & 0 \end{pmatrix} \begin{pmatrix} I^{(n-1)} \\ 0 \end{pmatrix} + \begin{pmatrix} L(I_*^{(n-2)}, \theta^{(n-1)}) & 0 \\ 0 & 0 \end{pmatrix} \begin{pmatrix} I^{(n-1)} - I^{(n-2)} \\ 0 \end{pmatrix} - \begin{pmatrix} \Psi(I_*^{(n-1)}, \theta^{(n)}) - \Psi(I_*^{(n-2)}, \theta^{(n-1)}) \\ 0 \end{pmatrix}$$
(1)

where the upper-right superscript (n) means a value at the n-th simulation step, $(L(I_*^{(n)}, \theta^{(n)}))_{ij} = L_{ij}(I_*^{(n)}, \theta^{(n)})$ $(R)_{ij} = R_i \delta_{i,j}$ $1 = (1, 1 \ldots 1)^T$: x-order unit vector $I^{(n)} = (I_1^{(n)}, I_2^{(n)}, \ldots, I_x^{(n)})^T$ $V_0^{(n)} = (V_{10}^{(n)}, V_{20}^{(n)}, \ldots, V_{x0}^{(n)})^T$ $\Psi(I_*^{(n)}, \theta^{(n)}) = (\Psi_1(I_*^{(n)}, \theta^{(n)}), \Psi_2(I_*^{(n)}, \theta^{(n)}), \ldots, \Psi_x(I_*^{(n)}, \theta^{(n)}))^T$ i,j: 1, 2, . . . , x
x: the number of phases for the motor
$R_i$: electrical resistance of each coil
$\Delta t$: time increment between simulation steps
$\delta_{i,j}$: Kronecker's delta
$L_{ij}(I_*^{(n)}, \theta^{(n)})$: self-inductance (i=j) of the i phase coil or mutual inductance (i≠j) between the i phase coil and the j phase coil
$I_*^{(n)}$: $(I_1^{(n)}, I_2^{(n)}, \ldots, I_x^{(n)})$
$\theta^{(n)}$: position of the mover
$V_n^{(n)}$: voltage at the neutral point
$I_1^{(n)}, I_2^{(n)}, \ldots, I_x^{(n)}$: current flowing in each coil
$V_{10}^{(n)}, V_{20}^{(n)}, \ldots, V_{x0}^{(n)}$: voltage to be applied to each coil
$\Psi_1, \Psi_2, \ldots, \Psi_x$: flux linage in each coil.

2. The non-transitory computer readable recording medium according to claim 1, wherein
   the electromagnetic component is a motor including a plurality of coils, a stator and a mover,
   the table is a look-up table storing flux linkages in the plurality of coils, inductances of the plurality of coils, currents in the plurality of coils and a position of the mover in association with one another, and
   the program causes the computer to execute the processing of simulating the behavior of the motor by referring to the look-up table using currents in the coils calculated at a previous simulation step and at a step before the previous simulation step and a position of the mover calculated at a previous simulation step.

3. The non-transitory computer readable recording medium according to claim 2, wherein the program causes the computer to execute processing of:
   acquiring voltages to be applied to the coils of the motor from an external driving circuit simulator,
   reading out inductances of the plurality of coils and flux linkages of the coils by referring to the look-up table using currents in the coils calculated at a previous simulation step and a position of the mover at a present simulation step,
   reading out inductances of the plurality of coils and flux linkages of the coils by referring to the look-up table using currents in the coils calculated at a step before the previous simulation step and a position of the mover at a previous simulation step, and
   calculating currents of the coils at a present simulation step based on the inductances of the coils and the flux linkages that are read out and the voltages acquired.

4. The non-transitory computer readable recording medium according to claim 2, wherein the electromagnetic component is a star-connected motor, and
   the program causes the computer to execute processing of:
   acquiring voltages to be applied to the coils of the motor from an external driving circuit simulator, reading out inductances of the plurality of coils and flux linkages in the coils by referring to the look-up table using currents in the coils calculated at a previous simulation step and a position of the mover at a present simulation step, reading out inductances of the plurality of coils and flux linkages of the coils by referring to the look-up table using currents in the coils calculated at a step before the previous simulation step and a position of the mover at a previous simulation step, and calculating a voltage at a neutral point at a present simulation step based on the inductances of the coils and the flux linkages that are read out and the voltages acquired.

5. A simulation method causing a computer to execute processing comprising:

creating a table by a magnetic field analysis based on an analytic model of an electromagnetic component including a coil, the table including a flux linkage of the coil, an inductance of the coil and a current in the coil in association with one another; and simulating behavior of the electromagnetic component at each of a plurality of time points by referring to the table using currents in the coil calculated at a previous simulation step and at a step before the previous simulation step;

wherein the electromagnetic component is a motor including a plurality of star-connected coils, and includes a stator and a mover, the table is a look-up table storing flux linkages of the plurality of coils, inductances of the plurality of coils, currents in the plurality of coils and a position of the mover in association with one another, and the method comprises causing the computer to execute processing of:

acquiring voltages to be applied to the coils of the motor from an external driving circuit simulator, reading out inductances of the plurality of coils and flux linkages of the coils by referring to the look-up table using currents the coils calculated at a previous simulation step and a position of the mover at a present simulation step, reading out inductances of the plurality of coils and flux linkages of the coils by referring to the look-up table using currents in the coils calculated at a step before the previous simulation step and a position of the mover at a previous simulation step, and calculating currents of the coils and a voltage at a neutral point at a present simulation step based on Equation (1) below:

$$\begin{pmatrix} L(I_*^{(n-1)}, \theta^{(n)}) + R\Delta t & 1\Delta t \\ 1^T & 0 \end{pmatrix} \begin{pmatrix} I^{(n)} \\ V_n^{(n)} \end{pmatrix} = \begin{pmatrix} V_0^{(n)}\Delta t \\ 0 \end{pmatrix} + \begin{pmatrix} L(I_*^{(n-1)}, \theta^{(n)}) & 0 \\ 0 & 0 \end{pmatrix}\begin{pmatrix} I^{(n-1)} \\ 0 \end{pmatrix} + \begin{pmatrix} L(I_*^{(n-2)}, \theta^{(n-1)}) & 0 \\ 0 & 0 \end{pmatrix}\begin{pmatrix} I^{(n-1)} - I^{(n-2)} \\ 0 \end{pmatrix} - \begin{pmatrix} \Psi(I_*^{(n-1)}, \theta^{(n)}) - \Psi(I_*^{(n-2)}, \theta^{(n-1)}) \\ 0 \end{pmatrix}$$ (1)

where the upper-right superscript (n) means a value at the n-th simulation step, $(L(I_*^{(n)}, \theta^{(n)}))_{ij} = L_{ij}(I_*^{(n)}, \theta^{(n)})$ $(R)_{ij} = R_i \delta_{i,j}$ $1 = (1,1 \ldots 1)^T$: $x$-order unit vector $I^{(n)} = (I_1^{(n)}, I_2^{(n)}, \ldots, I_x^{(n)})^T$ $V_0^{(n)} = (V_{10}^{(n)}, V_{20}^{(n)}, \ldots, V_{x0}^{(n)})^T$ $\Psi(I_*^{(n)}, \theta^{(n)}) = (\Psi_1(I_*^{(n)}, \theta^{(n)}), \Psi_2(I_*^{(n)}, \theta^{(n)}), \ldots, \Psi_x(I_*^{(n)}, \theta^{(n)}))^T$ i,j: 1, 2, . . . , x
x: the number of phases for the motor
$R_i$: electrical resistance of each coil
$\Delta t$: time increment between simulation steps
$\delta_{i,j}$: Kronecker's delta
$L_{ij}(I_*^{(n)}, \theta^{(n)})$: self-inductance (i=j) of the i phase coil or mutual inductance (i≠j) between the i phase coil and the j phase coil
$I_*^{(n)}$: $(I_1^{(n)}, I_2^{(n)}, \ldots, I_x^{(n)})$
$\theta^{(n)}$: position of the mover
$V_n^{(n)}$: voltage at the neutral point
$I_1^{(n)}, I_2^{(n)}, \ldots, I_x^{(n)}$: current flowing in each coil
$V_{10}^{(n)}, V_{20}^{(n)}, \ldots, V_{x0}^{(n)}$: voltage to be applied to each coil
$\Psi_1, \Psi_2, \ldots, \Psi_x$: flux linage in each coil.

6. A simulation device comprising an arithmetic unit, the arithmetic unit creating a table by a magnetic field analysis based on an analytic model of an electromagnetic component including a coil, the table including a flux linkage of the coil, an inductance of the coil and a current in the coil in association with one another, and simulating behavior of the electromagnetic component at each of a plurality of time points by referring to the table using currents in the coil calculated at a previous simulation step and at a step before the previous simulation step;

wherein the electromagnetic component is a motor including a plurality of star-connected coils, and includes a stator and a mover, the table is a look-up table storing flux linkages of the plurality of coils, inductances of the plurality of coils, currents in the plurality of coils and a position of the mover in association with one another, and the device comprises a program that causes the arithmetic unit to execute processing of:

acquiring voltages to be applied to the coils of the motor from an external driving circuit simulator, reading out inductances of the plurality of coils and flux linkages of the coils by referring to the look-up table using currents the coils calculated at a previous simulation step and a position of the mover at a present simulation step, reading out inductances of the plurality of coils and flux linkages of the coils by referring to the look-up table using currents in the coils calculated at a step before the previous simulation step and a position of the mover at a previous simulation step, and calculating currents of the coils and a voltage at a neutral point at a present simulation step based on Equation (1) below:

$$\begin{pmatrix} L(I_*^{(n-1)}, \theta^{(n)}) + R\Delta t & 1\Delta t \\ 1^T & 0 \end{pmatrix} \begin{pmatrix} I^{(n)} \\ V_n^{(n)} \end{pmatrix} = \begin{pmatrix} V_0^{(n)}\Delta t \\ 0 \end{pmatrix} + \begin{pmatrix} L(I_*^{(n-1)}, \theta^{(n)}) & 0 \\ 0 & 0 \end{pmatrix} \begin{pmatrix} I^{(n-1)} \\ 0 \end{pmatrix} + \begin{pmatrix} L(I_*^{(n-2)}, \theta^{(n-1)}) & 0 \\ 0 & 0 \end{pmatrix} \begin{pmatrix} I^{(n-1)} - I^{(n-2)} \\ 0 \end{pmatrix} - \begin{pmatrix} \Psi(I_*^{(n-1)}, \theta^{(n)}) - \Psi(I_*^{(n-2)}, \theta^{(n-1)}) \\ 0 \end{pmatrix} \quad (1)$$

where the upper-right superscript (n) means a value at the n-th simulation step, $(L(I_*^{(n)},\theta^{(n)}))_{ij} = L_{ij}(I_*^{(n)},\theta^{(n)})$ $(R)_{ij} = R_i \delta_{i,j}$ $1 = (1, 1 \ldots 1)^T$: $x$-order unit vector $I^{(n)} = (I_1^{(n)}, I_2^{(n)}, \ldots, I_x^{(n)})^T$ $V_0^{(n)} = (V_{10}^{(n)}, V_{20}^{(n)}, \ldots, V_{x0}^{(n)})^T$ $\Psi(I_*^{(n)},\theta^{(n)}) = (\Psi_1(I_*^{(n)},\theta^{(n)}), \Psi_2(I_*^{(n)},\theta^{(n)}), \ldots, \Psi_x(I_*^{(n)},\theta^{(n)}))^T$ i,j: 1, 2, . . . , x
x: the number of phases for the motor
$R_i$: electrical resistance of each coil
$\Delta t$: time increment between simulation steps
$\delta_{i,j}$: Kronecker's delta
$L_{ij}(I_*^{(n)},\theta^{(n)})$: self-inductance (i=j) of the i phase coil or mutual inductance (i≠j) between the i phase coil and the j phase coil
$I_*^{(n)}$: $(I_1^{(n)}, I_2^{(n)}, \ldots, I_x^{(n)})$
$\theta^{(n)}$: position of the mover
$V_n^{(n)}$: voltage at the neutral point
$I_1^{(n)}, I_2^{(n)}, \ldots, I_x^{(n)}$: current flowing in each coil
$V_{10}^{(n)}, V_{20}^{(n)}, \ldots, V_{x0}^{(n)}$: voltage to be applied to each coil
$\Psi_1, \Psi_2, \ldots, \Psi_x$: flux linage in each coil.

\* \* \* \* \*

UNITED STATES PATENT AND TRADEMARK OFFICE
CERTIFICATE OF CORRECTION

PATENT NO. : 11,074,378 B1
APPLICATION NO. : 16/950331
DATED : July 27, 2021
INVENTOR(S) : Takashi Yamada et al.

Page 1 of 1

It is certified that error appears in the above-identified patent and that said Letters Patent is hereby corrected as shown below:

In the Specification

Please replace "$RI_u$" with -- $RI_v$ -- (Column 1, Line 58);

Please replace "$I_q$" with -- $I_w$ -- (Column 1, Line 65);

Please replace "W has coil" with -- W phase coil -- (Column 8, Line 60);

Please replace "$L_{uw}$" with -- $L_{vw}$ -- (Column 10, Line 20);

Please replace "W phase call" with -- W phase coil -- (Column 10, Line 21); and

Please replace "$L_{vw}$" with -- $L_{ww}$ -- (Column 10, Line 29).

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*